US012626299B2

(12) United States Patent
Rutter et al.

(10) Patent No.: US 12,626,299 B2
(45) Date of Patent: May 12, 2026

(54) ADAPTIVE ANCHORING MECHANISM FOR RESOURCE PROXIES

(71) Applicant: NYDDEX, Inc., New York, NY (US)

(72) Inventors: Kevin Rutter, New York, NY (US); David Werblowsky, New Rochelle, NY (US)

(73) Assignee: NYDDEX, Inc., New York, NY (US)

( * ) Notice: Subject to any disclaimer, the term of this patent is extended or adjusted under 35 U.S.C. 154(b) by 0 days.

(21) Appl. No.: 19/271,098

(22) Filed: Jul. 16, 2025

(65) Prior Publication Data

US 2026/0057436 A1 Feb. 26, 2026

Related U.S. Application Data

(60) Provisional application No. 63/685,676, filed on Aug. 21, 2024.

(51) Int. Cl.
*G06Q 40/00* (2023.01)

(52) U.S. Cl.
CPC .................................... *G06Q 40/00* (2013.01)

(58) Field of Classification Search
CPC ...... G06Q 40/00; G06Q 40/04; G06Q 40/042; G06F 9/50
See application file for complete search history.

(56) References Cited

U.S. PATENT DOCUMENTS

2013/0024353 A1* 1/2013 Vice ...................... G06Q 40/04 705/37
2013/0054439 A1* 2/2013 Zhao ...................... G06Q 40/04 705/35
2017/0221145 A1* 8/2017 Weng ..................... G06Q 40/06
2022/0188925 A1* 6/2022 Blaikie, III ........ G06Q 30/0206

FOREIGN PATENT DOCUMENTS

CN 114493662 A * 5/2022 ............ G06N 20/00

OTHER PUBLICATIONS

English Translation for CN-114493662-A (Year: 2022).*
Gessert, Felix, et al. “The cache sketch: Revisiting expiration-based caching in the age of cloud data management.” Datenbanksysteme fÃ¼r Business, Technologie und Web (BTW 2015). Gesellschaft fÃ¼r Informatik eV, 2015. (Year: 2015).*

* cited by examiner

*Primary Examiner* — William S Brockington, III
(74) *Attorney, Agent, or Firm* — Perkins Coie LLP

(57) ABSTRACT

System and methods are disclosed comprising techniques for adaptive digital anchoring, such as generating an execution record set based on a monitored digital communication associated with executing entities, determining a terminal resource value for a standard resource unit and a terminal execution value for a digital resource proxy of the standard resource unit based on the execution record set, generating an anchoring parameter for aligning the terminal execution value of the digital resource proxy with the terminal resource value of the standard resource unit, generating a modified terminal execution value for the digital resource proxy by applying the anchoring parameter onto the terminal execution value, determining a distributive resource set of allocable resources associated with the active digital resource proxies and a recipient entity that is designated to receive the distributive resource set, and transmitting the distributive resource set of allocable resources to the recipient entity.

20 Claims, 10 Drawing Sheets

502

Example Product Specifications for Futures Contract

The following futures contracts have features of a contract for difference, perpetual future, and a traditional future; it is a linear derivative adjusted for the systems used to process traditional futures and cleared financial instruments.

Product: Oil

| Ref | Field | Specification |
|---|---|---|
| 510 | PRODUCT | Oil Contract |
| 512 | PRODUCT TYPE | Linear Long Maturity Derivative (Cash-Settled) |
| 514 | EXPIRATION | 10 Years |
| 516 | TRADING HOURS | Sunday 18:00 E.T. – Friday 17:00 E.T. |
| 518 | LISTED CONTRACTS | Single, Authoritative Contract |
| 520 | INDEX PRICE | Derived via an Oil/USD index price that updates every second (reliable, real-time, latency) |
| 522 | PRICE EXAMPLE | $73.83 |
| 524 | PRICE QUOTATION | U.S. Dollars and Cents Per Barrel |
| 526 | CONTRACT UNIT | 1 Barrel |
| 528 | MINIMUM ORDER SIZE | 1 Contract |
| 530 | QUOTE INCREMENT (TICK SIZE) | $0.01 |
| 532 | MINIMUM PRICE FLUCTUATION | $0.01 |
| 534 | INITIAL MARGIN | TBD |
| 536 | MAINTENANCE MARGIN | TBD |
| 538 | SETTLEMENT METHOD | Financially Cash-Settled |
| 540 | SETTLEMENT PROCEDURES | There is one end of day settlement price set by the Exchange to mark account values. This end of day settlement price is set to the index price daily. At maturity, the contract is cash-settled to the value of the index price. |
| 542 | FLOATING PRICE | N/A |
| 544 | PRODUCT CODE | TBD |
| 546 | POSITION LIMITS | TBD |
| 548 | EXCHANGE RULEBOOK | Drafted |
| 550 | BLOCK MINIMUM | N/A |
| 552 | PRICE LIMIT OR CIRCUIT | The product uses Dynamic Circuit Breakers, which means the range in which prices can move is reset continuously on a rolling 60-minute lookback window. If markets move +/- 10% in that time, a 2-minute halt is initiated. |
| 554 | VENDOR CODES | TBD |
| 556 | FEE STRUCTURE | Open Interest Fees |

Example Product Specifications for Futures Contract

The following futures contracts have features of a contract for difference, perpetual future, and a traditional future; it is a linear derivative adjusted for the systems used to process traditional futures and cleared financial instruments.

Product: Bitcoin

| | | |
|---|---|---|
| 510 | **PRODUCT** | Bitcoin Contract |
| 512 | **PRODUCT TYPE** | Linear Long Maturity Derivative (Cash-Settled) |
| 514 | **EXPIRATION** | 10 Years |
| 516 | **TRADING HOURS** | Sunday 18:00 E.T. – Friday 17:00 E.T. |
| 518 | **LISTED CONTRACTS** | Single, Authoritative Contract |
| 520 | **INDEX PRICE** | Derived via an BTC/USD index price that updates every second (reliable, real-time, latency) |
| 522 | **PRICE EXAMPLE** | $69.35 |
| 524 | **PRICE QUOTATION** | U.S. Dollars and Cents Per Bitcoin |
| 526 | **CONTRACT UNIT** | 1/1000 BTC |
| 528 | **MINIMUM ORDER SIZE** | 1 Contract |
| 530 | **QUOTE INCREMENT (TICK SIZE)** | $0.01 |
| 532 | **MINIMUM PRICE FLUCTUATION** | $0.01 |
| 534 | **INITIAL MARGIN** | TBD |
| 536 | **MAINTENANCE MARGIN** | TBD |
| 538 | **SETTLEMENT METHOD** | Financially Cash-Settled |
| 540 | **SETTLEMENT PROCEDURES** | There is one end of day settlement price set by the Exchange to mark account values. This end of day settlement price is set to the index price daily. At maturity, the contract is cash-settled to the value of the index price. |
| 542 | **FLOATING PRICE** | N/A |
| 544 | **PRODUCT CODE** | TBD |
| 546 | **POSITION LIMITS** | TBD |
| 548 | **EXCHANGE RULEBOOK** | Drafted |
| 550 | **BLOCK MINIMUM** | N/A |
| 552 | **PRICE LIMIT OR CIRCUIT** | The product uses Dynamic Circuit Breakers, which means the range in which prices can move is reset continuously on a rolling 60-minute lookback window. If markets move +/- 10% in that time, a 2-minute halt is initiated. |
| 554 | **VENDOR CODES** | TBD |
| 556 | **FEE STRUCTURE** | Open Interest Fees |

| Day (610) | Start of Day Future Price (612) | Mid-Day Future Price (614) | Mid-Day Spot Oil Price (616) | Projected End of Day Adjustment ("Funding Rate") (618) | End of Day Future Price (620) | End of Day Spot Oil Price (622) | End of Day Adjustment ("Funding Rate") (624) | End of Day Settlement Price (626) |
|---|---|---|---|---|---|---|---|---|
| 1 | 73.83 | 73.84 | 73.84 | 0.0000% | 73.83 | 73.84 | -0.0135% | 73.84 |
| 2 | 73.84 | 73.83 | 73.86 | -0.0406% | 73.84 | 73.85 | -0.0135% | 73.85 |
| 3 | 73.85 | 73.84 | 73.85 | -0.0135% | 73.83 | 73.86 | -0.0406% | 73.86 |
| 4 | 73.86 | 73.84 | 73.84 | 0.0000% | 73.85 | 73.82 | 0.0406% | 73.82 |
| 5 | 73.82 | 73.82 | 73.81 | 0.0135% | 73.83 | 73.81 | 0.0271% | 73.81 |
| 6 | 73.81 | 73.79 | 73.80 | -0.0136% | 73.83 | 73.80 | 0.0406% | 73.80 |
| 7 | 73.80 | 73.81 | 73.80 | 0.0135% | 73.79 | 73.79 | 0.0000% | 73.79 |
| 8 | 73.79 | 73.79 | 73.80 | -0.0136% | 73.79 | 73.82 | -0.0407% | 73.82 |
| 9 | 73.82 | 73.82 | 73.80 | 0.0271% | 73.80 | 73.82 | -0.0271% | 73.82 |
| 10 | 73.82 | 73.84 | 73.81 | 0.0406% | 73.83 | 73.79 | 0.0542% | 73.79 |
| 11 | 73.79 | 73.78 | 73.77 | 0.0136% | 73.77 | 73.76 | 0.0136% | 73.76 |
| 12 | 73.76 | 73.78 | 73.77 | 0.0136% | 73.75 | 73.75 | 0.0000% | 73.75 |

| Day (610) | Start of Day Future Price (612) | Mid-Day Future Price (614) | Mid-Day Spot BTC Price (616) | Projected End of Day Adjustment ("Funding Rate") (618) | End of Day Future Price (620) | End of Day Spot BTC Price (622) | End of Day Adjustment ("Funding Rate") (624) | End of Day Settlement Price (626) |
|---|---|---|---|---|---|---|---|---|
| 1 | 65,400 | 65,400 | 65,408 | -0.0122% | 65,396 | 65,416 | -0.0306% | 65,416 |
| 2 | 65,416 | 65,411 | 65,411 | 0.0000% | 65,423 | 65,418 | 0.0076% | 65,418 |
| 3 | 65,418 | 65,425 | 65,420 | 0.0076% | 65,415 | 65,426 | -0.0168% | 65,426 |
| 4 | 65,426 | 65,426 | 65,417 | 0.0138% | 65,420 | 65,408 | 0.0183% | 65,408 |
| 5 | 65,408 | 65,399 | 65,409 | -0.0153% | 65,400 | 65,402 | -0.0031% | 65,402 |
| 6 | 65,402 | 65,395 | 65,406 | -0.0168% | 65,411 | 65,397 | 0.0214% | 65,397 |
| 7 | 65,397 | 65,392 | 65,398 | -0.0092% | 65,396 | 65,402 | -0.0092% | 65,402 |
| 8 | 65,402 | 65,394 | 65,399 | -0.0076% | 65,397 | 65,402 | -0.0076% | 65,402 |
| 9 | 65,402 | 65,404 | 65,399 | 0.0076% | 65,392 | 65,391 | 0.0015% | 65,391 |
| 10 | 65,391 | 65,384 | 65,398 | -0.0214% | 65,381 | 65,392 | -0.0168% | 65,392 |
| 11 | 65,392 | 65,400 | 65,401 | -0.0015% | 65,394 | 65,402 | -0.0122% | 65,402 |
| 12 | 65,402 | 65,412 | 65,402 | 0.0153% | 65,394 | 65,394 | 0.0000% | 65,394 |

ADAPTIVE ANCHORING MECHANISM FOR RESOURCE PROXIES

CROSS-REFERENCE TO RELATED APPLICATIONS

This application claims priority to U.S. Provisional Patent Application No. 63/685,676, filed on Aug. 21, 2024, entitled DYNAMIC ANCHORING MECHANISMS FOR ROBUST ALIGNMENT SYSTEMS AND METHODS, which is hereby incorporated by reference in its entirety.

BACKGROUND

Synchronization mechanisms in distributed computing architectures constitute a fundamental technical requirement for maintaining data integrity and operational coherence across heterogeneous system components. As computational infrastructures evolve toward increased complexity and horizontal scalability, the technical challenges inherent in implementing precise temporal coordination of data states across multiple processing nodes are substantially magnified. Conventional synchronization protocols predominantly implement deterministic update intervals or static reconciliation schedules, which exhibit significant limitations when deployed in contemporary high-throughput computing environments where continuous data congruence and short-term state propagation represent critical system requirements.

The technical constraints of established synchronization methodologies become particularly pronounced in computational contexts necessitating high-frequency state updates across distributed system architectures. These technical limitations frequently manifest as processing inefficiencies, data state inconsistencies, and potential system degradation, particularly within environments where algorithmic decision processes and precise inter-entity coordination are essential operational parameters. Furthermore, legacy infrastructure implementations often lack the necessary technical capabilities to accommodate dynamic synchronization protocols capable of adapting to variable network conditions, fluctuating processing loads, or differential update frequency requirements. As distributed computing paradigms continue their technical evolution, there exists a substantive requirement for advanced synchronization algorithms and methodologies that can integrate seamlessly with established computational frameworks while delivering the requisite performance characteristics, temporal precision, and adaptive capabilities demanded by modern distributed applications and specialized use cases.

BRIEF DESCRIPTION OF THE DRAWINGS

Detailed descriptions of implementations of the present invention will be described and explained through the use of the accompanying drawings.

FIGS. 5A-5B are block diagrams that illustrate example product specifications for sample digital resource proxies in accordance with some implementations of the disclosed technology.

FIGS. 6A-6B are block diagrams that illustrate example anchoring mechanisms for sample digital resource proxies in accordance with some implementations of the disclosed technology.

Figure 1:
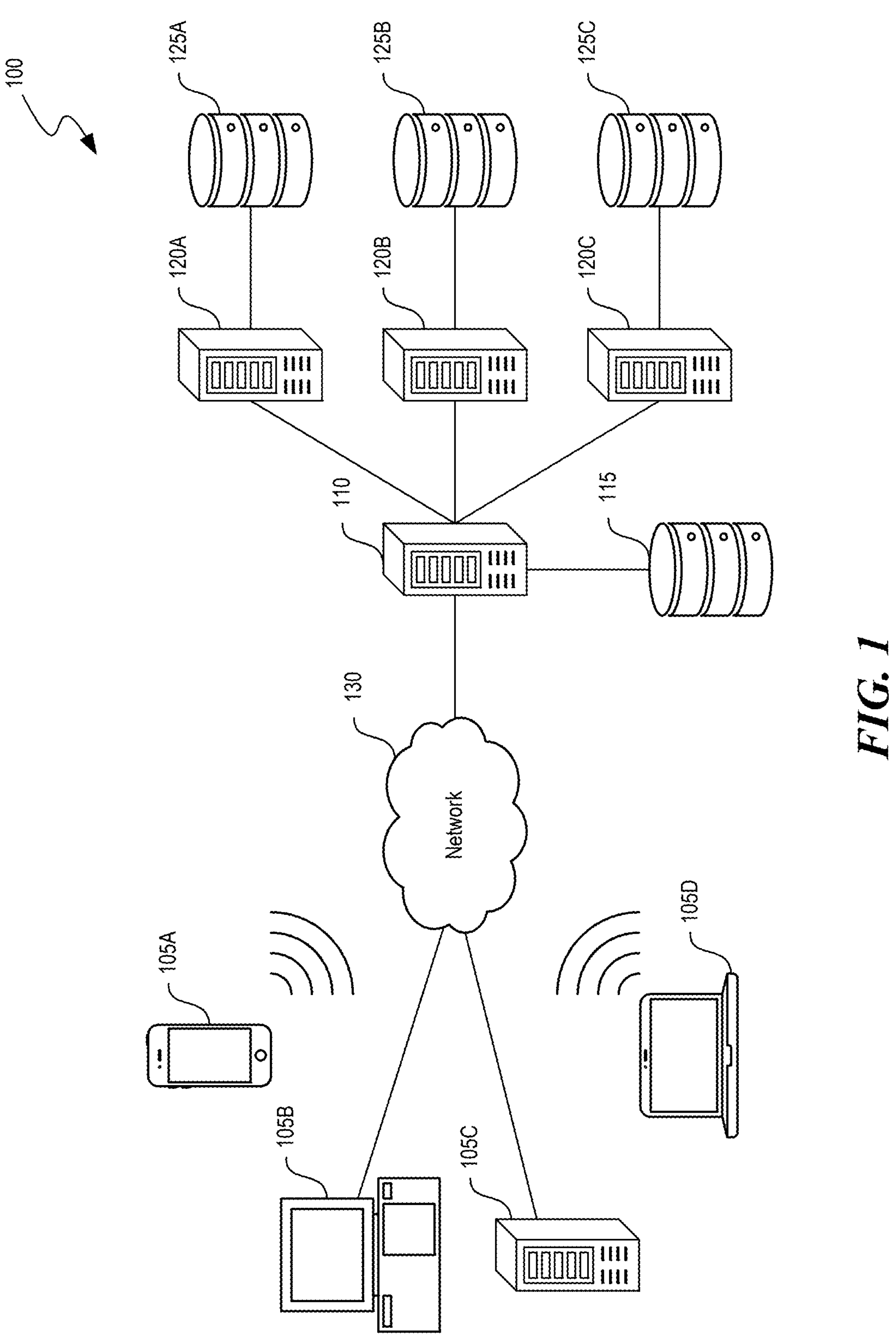
FIG. 1 is a system diagram illustrating an example of a computing environment in which the disclosed system operates in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional distributed computing architectures present substantial technical limitations for implementing adaptive data synchronization mechanisms that provide continuous alignment between distributed resource representations without predetermined synchronization intervals. This challenge stems from the rigid, statically-defined nature of conventional data exchange protocols and the associated processing systems (e.g., request handling, data transformation, caching) that have evolved over decades to support these standardized communication patterns. Current distributed system infrastructures are specifically engineered for discrete data exchanges with predefined specifications (e.g., fixed JSON schemas, XML document types, Protocol Buffer definitions, scheduled polling intervals, standardized request-response cycles) and lack the necessary flexibility to accommodate more dynamic, continuously synchronized data flows.

Existing distributed computing frameworks operate through sophisticated, multi-layered architectures comprising multiple interconnected components (e.g., application servers, database systems, message brokers, API gateways, load balancers, caching layers) that must coordinate their operations to maintain data integrity and system coherence. These frameworks impose stringent requirements on data exchange patterns and synchronization processing that are fundamentally incompatible with the operational requirements of continuous data alignment mechanisms. Specifically, the absence of fixed synchronization schedules, the requirement for frequent (often near instantaneous) state propagation between distributed nodes, and the capability to process variable-sized data units present significant integration challenges for current distributed system architectures.

Contemporary systems outside traditional enterprise architectures have implemented alternative methodologies to offer more flexible data synchronization capabilities. For instance, modern cloud platforms frequently function as vertically integrated environments capable of offering eventdriven synchronization without the constraints inherent in conventional request-response patterns. However, these systems typically consolidate processing logic within centralized services and lack the robust distribution and fault tolerance mechanisms embedded in mature distributed computing frameworks. Additionally, peer-to-peer synchronization protocols exist in numerous implementations, but these decentralized approaches lack the consistency guarantees, scalability, and centralized management advantages characteristic of enterprise-grade distributed systems.

The disclosed system addresses these limitations through the introduction of a novel anchoring mechanism that leverages existing operational procedures within distributed computing infrastructures to create a synthetic rebalancing effect analogous to continuous synchronization. The system utilizes the computational capabilities of distributed processing nodes to establish periodic reference values for resource proxies. For example, the system implements an algorithm that adjusts the representation value of a resource proxy to align it with a reference value derived from the underlying resource, thereby creating a synthetic state alignment without necessitating continuous data transmission between distributed components.

The system monitors digital communications associated with executing entities (e.g., client applications, service endpoints, message queue subscribers) over defined time intervals to generate an execution record set. For example, the system captures and processes data exchange operations, including request parameters and response payloads, throughout the operational period. Furthermore, the system determines, at the expiration of each time interval (e.g., end of processing cycle), both a terminal resource value for the underlying resource and a terminal execution value for the resource proxy based on the recorded execution data.

The system generates an anchoring parameter by calculating the deviation between the terminal resource value and the terminal execution value. For example, this anchoring parameter represents the percentage difference between the current state of the resource proxy and the actual state of the underlying resource. The system subsequently applies this anchoring parameter to generate a modified terminal execution value for the resource proxy, effectively aligning the proxy representation with the underlying resource's value.

The system utilizes this modified terminal execution value, rather than the unadjusted proxy state, to determine the distribution of allocable resources (e.g., memory allocations, processing capacity, network bandwidth, database connections, thread pool resources) associated with the active resource proxies. For example, the system calculates the difference between each proxy's execution value and the modified terminal execution value to determine the magnitude and direction of resource transfers required. Furthermore, the system identifies the appropriate recipient entities (e.g., processing nodes, service instances) for these resource distributions based on their respective system responsibilities.

The disclosed system can be applied to various technological domains beyond traditional commodity and financial futures markets. For instance, the system can be adapted for implementation in emerging digital asset markets (e.g., cryptocurrency derivatives) where the requirement for continuous exposure products is particularly acute. The system can also be applied to environmental markets (e.g., carbon credit derivatives) where long-term, flexible instruments are desired but must operate within regulated market structures. Additionally, the system's principles could be extended to other domains requiring dynamic alignment of digital representations with underlying real-world values, such as in supply chain management systems or decentralized finance (DeFi) protocols.

In some aspects, the system can create synthetic perpetual futures-like products within the existing U.S. regulatory framework by leveraging the discretionary authority of designated contract markets (DCMs) to establish end-of-day settlement prices. This approach may allow for the introduction of innovative derivative products that provide continuous exposure to underlying digital assets with longer term expiration dates, or without predetermined expiration dates, while still operating within the established post-trade processing systems of derivatives clearing organizations (DCOs) and futures commission merchants (FCMs).

The system may also be applied to environmental markets where long-term, flexible instruments are desired but must operate within regulated market structures. For example, in carbon credit derivative markets, the system can potentially create products that provide continuous exposure to carbon pricing without fixed maturity dates. By implementing the anchoring mechanism, the system may adjust daily settlement prices of carbon credit futures to align with reference values derived from spot carbon markets or emissions trading systems. This approach could offer market participants more flexible hedging and trading opportunities while maintaining compatibility with existing clearing and settlement infrastructures.

The system may also be extended to supply chain management systems to enable dynamic alignment of digital representations with underlying real-world inventory or logistics data. For instance, the system may monitor digital communications associated with various supply chain entities (e.g., manufacturers, distributors, retailers) to generate execution record sets reflecting current inventory levels, production rates, or shipping status. The anchoring mechanism could then be applied to adjust digital inventory representations or logistics planning parameters, creating a synthetic rebalancing effect that maintains alignment between digital systems and physical realities without requiring constant manual updates or real-time data streams from every node in the supply chain.

Example Computing Environment

FIG. 1 is a system diagram illustrating an example of a computing environment in which the disclosed system operates in some implementations. In some implementations, environment 100 includes one or more client computing devices 105A-D, examples of which can host the digital anchoring system 200 of FIG. 2. Client computing devices 105 operate in a networked environment using logical connections through network 130 to one or more remote computers, such as a server computing device.

In some implementations, server 110 is an edge server which receives client requests and coordinates fulfillment of those requests through other servers, such as servers 120A-C. In some implementations, servers 110 and 120, or associated computing devices, comprise computing systems, such as the digital anchoring system 200 of FIG. 2. Though each server 110 and 120, or associated computing device, is displayed logically as a single server, server computing devices can each be a distributed computing environment encompassing multiple computing devices located at the same or at geographically disparate physical locations. In some implementations, each server 120 corresponds to a group of servers.

Client computing devices 105 and servers 110 and 120, or associated computing devices, can each act as a server or client to other server or client devices. In some implementations, servers (110, 120A-C) connect to a corresponding database (115, 125A-C). As discussed above, each server 120 can correspond to a group of servers, and each of these servers can share a database or can have its own database. Databases 115 and 125 warehouse (e.g., store) information such as claims data, email data, call transcripts, call logs, policy data and so on. Though databases 115 and 125 are displayed logically as single units, databases 115 and 125 can each be a distributed computing environment encompassing multiple computing devices, can be located within their corresponding server, or can be located at the same or at geographically disparate physical locations.

Network 130 can be a local area network (LAN) or a wide area network (WAN) but can also be other wired or wireless networks. In some implementations, network 130 is the Internet or some other public or private network. Client computing devices 105 are connected to network 130 through a network interface, such as by wired or wireless communication. While the connections between server 110 and servers 120 are shown as separate connections, these connections can be any kind of local, wide area, wired, or wireless network, including network 130 or a separate public or private network.

Digital Anchoring System

Figure 2:
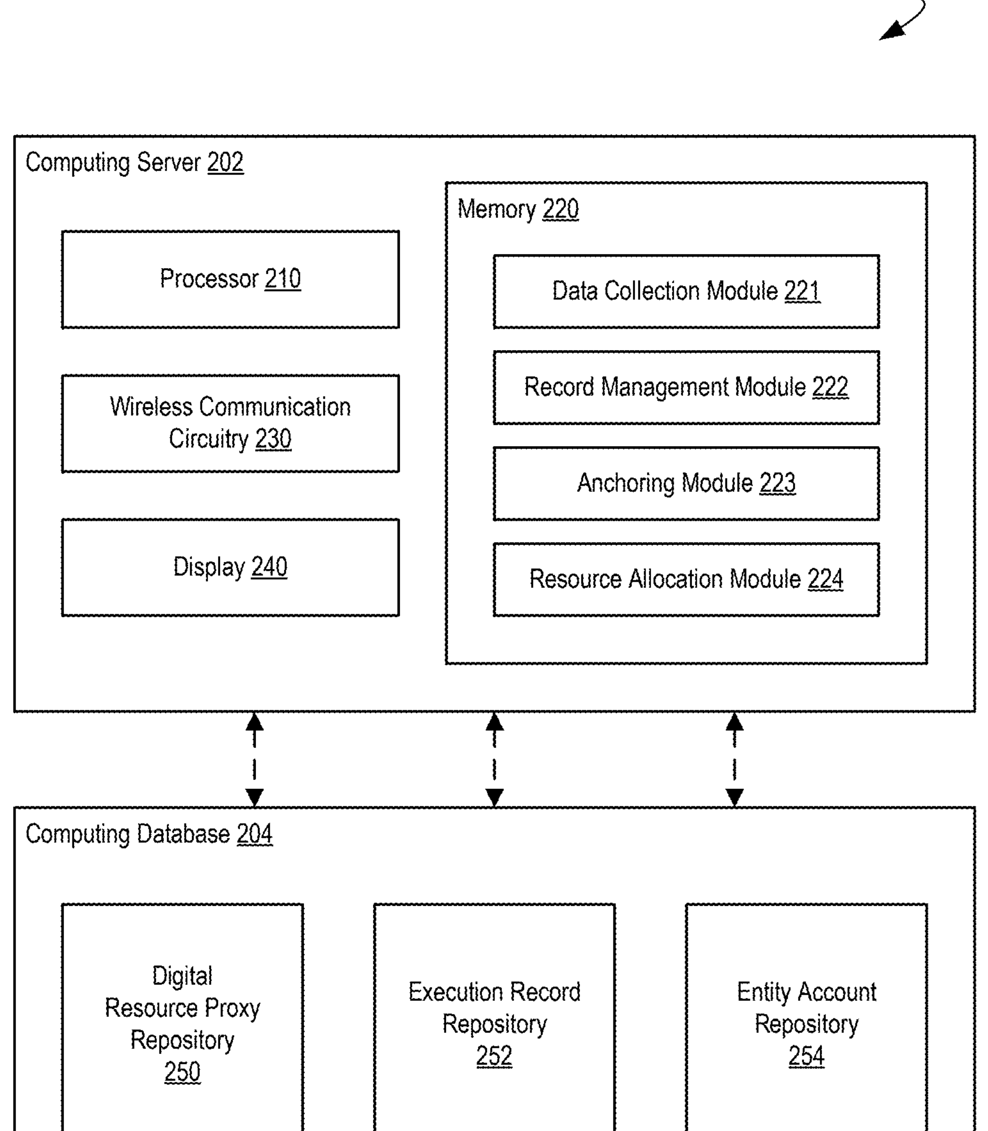
FIG. 2 is a block diagram that illustrates a digital anchoring system that can implement aspects of the present technology.

FIG. 2 is a block diagram that illustrates a digital anchoring system 200 ("system 200") that can implement aspects of the present technology. The components shown in FIG. 2 are merely illustrative, and well-known components are omitted for brevity. As shown, the computing server 202 includes a processor 210, a memory 220, a wireless communication circuitry 230 to establish wireless communication and/or information channels (e.g., Wi-Fi, internet, APIs, communication standards) with other computing devices and/or services (e.g., servers, databases, cloud infrastructure), and a display 240 (e.g., user interface). The processor 210 can have generic characteristics similar to general-purpose processors, or the processor 210 can be an application-specific integrated circuit (ASIC) that provides arithmetic and control functions to the computing server 202. While not shown, the processor 210 can include a dedicated cache memory. The processor 210 can be coupled to all components of the computing server 202, either directly or indirectly, for data communication. Further, the processor 210 of the computing server 202 can be communicatively coupled to a computing database 204 that is hosted alongside the computing server 202 on the core network 130 described in reference to FIG. 1. As shown, the computing database 204 can include a digital resource proxy repository 250, an execution record repository 252, and an entity account repository 254.

The memory 220 can comprise any suitable type of storage device including, for example, a static random-access memory (SRAM), dynamic random-access memory (DRAM), electrically erasable programmable read-only memory (EEPROM), flash memory, latches, and/or registers. In addition to storing instructions that can be executed by the processor 210, the memory 220 can also store data generated by the processor 210 (e.g., when executing the modules of an optimization platform). In additional, or alternative, embodiments, the processor 210 can store temporary information onto the memory 220 and store long-term data onto the computing database 204. The memory 220 is merely an abstract representation of a storage environment. Hence, in some embodiments, the memory 220 comprises one or more actual memory chips or modules.

As shown in FIG. 2, modules of the memory 220 can include a data collection module 221, record management module 222, an anchoring module 223, and a data allocation module 224. Other implementations of the computing server 202 include additional, fewer, or different modules, or distribute functionality differently between the modules. As used herein, the term "module" and/or "engine" refers broadly to software components, firmware components, and/or hardware components. Accordingly, the modules 221-224 could each comprise software, firmware, and/or hardware components implemented in, or accessible to, the computing server 202.

In some implementations, the digital anchoring system 200 can be structured to integrate with existing derivatives contract exchange infrastructures (e.g., futures exchanges, options exchanges, swap execution facilities, and/or the like) while providing enhanced functionality for dynamic anchoring of digital resource proxies (e.g., derivatives and/or futures contracts) to underlying standard resource units. The digital anchoring system 200 can comprise interconnected subsystems, each configured to execute specific aspects of the digital resource proxy lifecycle (e.g., creation, execution, settlement, clearing, and/or the like). These subsystems can work in concert to ensure the accurate representation and efficient processing of digital resource proxies within a regulated financial environment.

For example, the data collection module 221, record management module 222, anchoring module 223, digital resource proxy repository 250, and execution record repository 252 can operate as an integrated computing subsystem within a designated contract market (DCM) infrastructure. This DCM subsystem can execute the core technical operations of digital resource proxy creation, transaction processing, and price alignment. The data collection module 221 can connect to existing market data feeds and external data sources through standardized APIs to retrieve and process real-time information required for proxy valuation calculations. The record management module 222 and execution record repository 252 can integrate with trade capture systems via database connectors and messaging protocols, storing all digital resource proxy transactions in a structured format that supports audit trail generation. The anchoring module 223 can execute computational algorithms during end-of-day settlement processes, applying custom anchoring parameters (e.g., a synthetic funding rate for derivatives and/or futures contracts) to adjust settlement prices while maintaining data structure compatibility with standard derivatives and/or futures processing workflows. The digital resource proxy repository 250 can implement an extended database schema that augments existing contract databases with additional data fields and relational structures specific to digital resource proxies.

In another example, the resource allocation module 224 and entity account repository 254 can operate as a separate computing subsystem within a derivatives clearing organization (DCO). This DCO subsystem can process the post-trade data flows of digital resource proxies, executing clearing, settlement, and risk management functions. The resource allocation module 224 can interface with existing margin calculation and collateral management systems through standardized APIs, applying the modified terminal execution values to compute resource allocations based on predefined algorithms. The entity account repository 254 can extend current clearing member and customer account databases with additional data fields and relational structures that accommodate the technical characteristics of digital resource proxies, including continuous exposure parameters and synthetic secondary settlement records.

By grouping these components into DCM and DCO subsystems, the digital anchoring system 200 can maintain a clear separation of functions that aligns with existing regulatory frameworks and operational boundaries in derivatives markets. This approach allows for the introduction of novel digital resource proxy functionality while minimizing disruption to established processes and systems. For example, the DCM subsystem can focus on digital resource proxy creation, execution processing, and anchoring mechanism operations, while the DCO subsystem can concentrate on resource allocation calculations, distributive resource set management, and entity account settlement procedures.

Furthermore, the integration of these subsystems within existing infrastructures can facilitate seamless communication between front-office trading systems and back-office clearing processes. For instance, the anchoring module 223 in the DCM subsystem can generate modified terminal execution values, which are then transmitted to the resource allocation module 224 in the DCO subsystem for use in margin calculations and settlement procedures. This integration ensures that the novel aspects of digital resource proxies, such as the anchoring mechanism, are properly reflected throughout the entire trade lifecycle within the existing derivatives exchange ecosystem.

In some implementations, the data collection module 221 within the memory 220 can be configured to monitor and extract preprocessing data relevant to digital resource proxies. The data collection module 221 can interface with external data sources (e.g., market data providers, regulatory feeds, economic indicators, and/or the like) to acquire real-time information affecting the valuation and execution of digital resource proxies. For example, the data collection module 221 can establish secure socket layer (SSL) connections with authorized data providers to receive encrypted data streams comprising price quotes, trading volumes, and market depth information for standard resource units. The data collection module 221 can then parse and normalize this incoming data, converting it into a standardized format compatible with other modules of the digital anchoring system 200. Additionally, the data collection module 221 can implement data validation routines to detect and flag anomalies or potential errors in the received information, ensuring the integrity of the data used in subsequent processing steps.

In some implementations, the data collection module 221 can include advanced real-time communication capabilities to facilitate the continuous acquisition and processing of diverse data streams relevant to digital resource proxies. The data collection module 221 can establish and maintain multiple concurrent network connections (e.g., TCP/IP connections, WebSocket connections, UDP streams, and/or the like) with various external data sources (e.g., market data providers, regulatory agencies, economic research institutions, and/or the like) to ensure a constant influx of up-to-date information. These network connections can be secured using industry-standard encryption protocols (e.g., TLS 1.3, AES-256, elliptic curve cryptography, and/or the like) to protect the confidentiality and integrity of the transmitted data. The data collection module 221 can implement adaptive connection management algorithms that dynamically adjust connection parameters (e.g., buffer sizes, timeout intervals, reconnection strategies, and/or the like) based on network conditions and data flow characteristics to optimize throughput and minimize latency. For example, the data collection module 221 can utilize a custom-designed low-latency protocol that combines elements of UDP for speed with selective acknowledgment and retransmission mechanisms to ensure reliability in high-frequency data scenarios. This protocol can be specifically tailored to handle the rapid transmission of small, frequent updates typical in financial market data feeds, allowing the system to process thousands of price updates per second with minimal delay.

In some implementations, the data collection module 221 can include capabilities for collecting and processing a wide range of financial and market-related data types relevant to digital resource proxies. The data collection module 221 can be configured to gather real-time price data (e.g., bid prices, ask prices, last traded prices, and/or the like) for various standard resource units (e.g., commodities, currencies, cryptocurrencies, equities, and/or the like) that serve as the underlying assets for digital resource proxies. This price data can be collected from multiple sources (e.g., exchanges, over-the-counter markets, brokers, data aggregators, and/or the like) to ensure comprehensive coverage and enable cross-validation of pricing information. The data collection module 221 can implement sophisticated data normalization algorithms to harmonize price data from disparate sources, accounting for differences in formatting, time zones, and decimal precision. For example, the data collection module 221 can utilize a custom-built price normalization engine that applies source-specific transformation rules to convert all incoming price data into a standardized format with uniform precision and timestamp granularity.

In some implementations, the data collection module 221 can include functionality for acquiring and processing trading volume data associated with standard resource units and their corresponding digital resource proxies. The trading volume data can encompass detailed information about executed trades (e.g., transaction sizes, execution timestamps, trade directions, and/or the like) as well as aggregated volume metrics (e.g., daily trading volume, moving average volume, volume-weighted average price (VWAP), and/or the like). The data collection module 221 can be designed to handle high-frequency volume updates, potentially processing millions of individual trade records per day for liquid assets. To efficiently manage this data influx, the data collection module 221 can employ a multi-tiered data storage architecture that combines in-memory caching for real-time access with periodic batch updates to persistent storage. For instance, the data collection module 221 can utilize a distributed cache system (e.g., Redis, Memcached, Apache Ignite, and/or the like) to maintain rolling windows of recent trading activity, enabling rapid calculation of short-term volume metrics without the need for frequent database queries.

In some implementations, the data collection module 221 can include advanced capabilities for gathering and analyzing order book data for both standard resource units and digital resource proxies. The order book data can provide a comprehensive view of market depth (e.g., pending buy orders, pending sell orders, order sizes, limit prices, and/or the like) at multiple price levels. The data collection module 221 can be engineered to capture and process full order book snapshots as well as incremental updates, allowing for the maintenance of an up-to-date representation of market liquidity. To efficiently handle the high update frequency of order book data, particularly for actively traded assets, the data collection module 221 can implement a custom order book management system optimized for low-latency operations. This system can utilize lock-free data structures and parallel processing techniques to minimize contention and maximize throughput when updating the order book state. For example, the data collection module 221 can employ a multi-threaded order book update engine that distributes incoming updates across multiple worker threads, each responsible for maintaining a subset of the price levels within the order book. This parallel processing approach can enable the system to handle hundreds of thousands of order book updates per second while maintaining sub-millisecond update latencies.

In some implementations, a record management module 222 within the memory 220 can maintain a comprehensive log of all activities related to digital resource proxies. The record management module 222 can create, update, and store execution records in the execution record repository 252, providing a tamper-resistant audit trail of all transactions. For instance, the record management module 222 can utilize blockchain technology to create an immutable ledger of execution records, with each new record being cryptographically linked to previous records. This approach can ensure the integrity and non-repudiation of transaction histories. Furthermore, the record management module 222 can implement advanced indexing and search capabilities, allowing for rapid retrieval of specific execution records based on various criteria (e.g., timestamp, executing entity, digital resource proxy identifier, and/or the like). The record management module 222 can also generate periodic reports summarizing execution activity, which can be used for regulatory compliance, performance analysis, and risk management purposes.

In some implementations, an anchoring module 223 within the memory 220 can align terminal execution values of digital resource proxies (e.g., futures contracts, perpetual futures, contracts for difference (CFDs), options contracts) with terminal resource values of corresponding standard resource units (e.g., commodities, cryptocurrencies, equity indices, foreign exchange rates). The anchoring module 223 can analyze the terminal resource values and terminal execution values to generate appropriate anchoring parameters (e.g., funding rates, price adjustment factors, convergence mechanisms). For example, the anchoring module 223 can generate an anchoring parameter based on a detected deviation between the terminal execution value (e.g., closing futures price) and the terminal resource value (e.g., spot price) of the standard resource unit. This anchoring parameter quantifies the deviation between the digital resource proxy terminal execution value and the standard resource unit terminal resource value. The anchoring module 223 then applies this anchoring parameter to the terminal execution value, effectively displacing the terminal execution value towards the terminal resource value. This adjustment creates a modified terminal execution value (e.g., adjusted settlement price, synthetic funding payment) that maintains proper alignment between the digital resource proxy and its underlying standard resource unit. The anchoring module 223 can implement this anchoring mechanism at expiration of a time interval (e.g., trading day, funding period, settlement window) as part of the end-of-day settlement process, ensuring continuous alignment without requiring changes to existing futures market infrastructure (e.g., clearinghouses, margin systems, trade processing platforms).

In some implementations, a resource allocation module 224 within the memory 220 can manage the distribution of allocable resources (e.g., margin deposits, variation margin payments, settlement funds, collateral assets) associated with digital resource proxy activations (e.g., futures contracts, perpetual futures, contracts for difference). The resource allocation module 224 can determine the appropriate recipient entities (e.g., futures commission merchants, clearing members, end clients) for distributive resource sets based on the modified terminal execution values (e.g., adjusted settlement prices) and predefined allocation rules. For instance, the resource allocation module 224 can implement a multi-tier allocation algorithm that prioritizes resource distribution based on factors such as execution volume (e.g., number of contracts traded), market making activity (e.g., bid-ask spread maintenance, liquidity provision), and risk exposure (e.g., position size, portfolio concentration). The resource allocation module 224 can determine, using a detected deviation between the execution values of active digital resource proxies (e.g., traded futures prices) and the modified terminal execution value (e.g., adjusted settlement price) instead of the terminal execution value (e.g., unadjusted settlement price), a distributive resource set of allocable resources associated with activation of the active digital resource proxies. The resource allocation module 224 can identify a recipient entity that is designated to receive the distributive resource set of allocable resources based on resource allocation thresholds (e.g., price deviation percentages, funding rate limits). When the detected deviation satisfies the resource allocation threshold, the resource allocation module 224 can assign an entity from the executing entities (e.g., futures commission merchant (FCM)) as the recipient entity. When the detected deviation does not satisfy the resource allocation threshold, the resource allocation module 224 can assign an entity separate from the executing entities (e.g., clearinghouse, exchange) as the recipient entity. The resource allocation module 224 can also identify an entity account (e.g., margin account, settlement account, collateral account) associated with the recipient entity, the entity account comprising a stored resource set of allocable resources and update the entity account by adding the allocable resources of the distributive resource set to the stored resource set. Furthermore, the resource allocation module 224 can determine a source entity (e.g., counterparty futures commission merchant, clearing member) designated to provision the distributive resource set of allocable resources, retrieve the distributive resource set from the source entity, and transmit the distributive resource set to the recipient entity prior to monitoring digital communication associated with executing entities (e.g., futures commission merchants) over a subsequent time interval (e.g., next trading day, next funding period).

In some implementations, the computing database 204 can serve as the persistent storage component of the digital anchoring system 200. The computing database 204 can be designed to handle high-volume, low latency read and write operations typical of financial trading systems. For example, the computing database 204 can utilize a distributed architecture with multiple nodes (e.g., sharded databases, replicated databases, and/or the like) to distribute data storage and processing loads across multiple physical servers. This approach can enable parallel query execution and improve overall system responsiveness. The computing database 204 can also implement advanced caching mechanisms (e.g., in-memory databases, solid-state drive caching, and/or the like) to minimize disk 1/O operations and reduce data access latencies. Additionally, the computing database 204 can employ sophisticated backup and recovery procedures, including real-time replication and point-in-time recovery capabilities, to ensure data integrity and availability in the event of hardware failures or other disruptions.

In some implementations, a digital resource proxy repository 250 within the computing database 204 can store comprehensive information about all digital resource proxies managed by the digital anchoring system 200. The digital resource proxy repository 250 can maintain detailed records of proxy attributes, including contract specifications, execution histories, and current status. For instance, the digital resource proxy repository 250 can utilize a hierarchical data structure to efficiently organize and retrieve proxy information based on various criteria (e.g., underlying standard resource unit, expiration date, executing entity, and/or the like). The digital resource proxy repository 250 can also implement versioning controls to track changes in proxy attributes over time, enabling historical analysis and audit trails. Furthermore, the digital resource proxy repository 250 can support real-time updates and concurrent access from multiple system components, ensuring that all modules of the digital anchoring system 200 operate with the most current proxy information.

In some implementations, an execution record repository 252 within the computing database 204 can store a comprehensive history of all execution activities related to digital resource proxies. The execution record repository 252 can maintain detailed logs of every transaction, including timestamps, participating entities, execution values, and associated metadata. For example, the execution record repository 252 can implement a time-series database optimized for efficient storage and retrieval of chronological data, enabling rapid analysis of historical execution patterns. The execution record repository 252 can also utilize compression algorithms specifically designed for financial data to minimize storage requirements while maintaining data fidelity. Additionally, the execution record repository 252 can support advanced querying capabilities, allowing for complex analytics such as identifying correlated execution patterns across multiple digital resource proxies or detecting potential market manipulation attempts through anomaly detection algorithms.

In some implementations, an entity account repository 254 within the computing database 204 can manage account information for all participants in the digital anchoring system 200. The entity account repository 254 can store detailed records of account balances, trading permissions, risk profiles, and historical activities for each entity. For instance, the entity account repository 254 can implement a multi-dimensional data model that allows for efficient querying of account information across various attributes (e.g., account type, trading volume, risk exposure, and/or the like). The entity account repository 254 can also support real-time updates to account balances and positions, ensuring accurate representation of each entity's financial status within the system. Furthermore, the entity account repository 254 can implement sophisticated access control mechanisms, using role-based permissions and encryption to protect sensitive account information from unauthorized access or modification.

Figure 3:
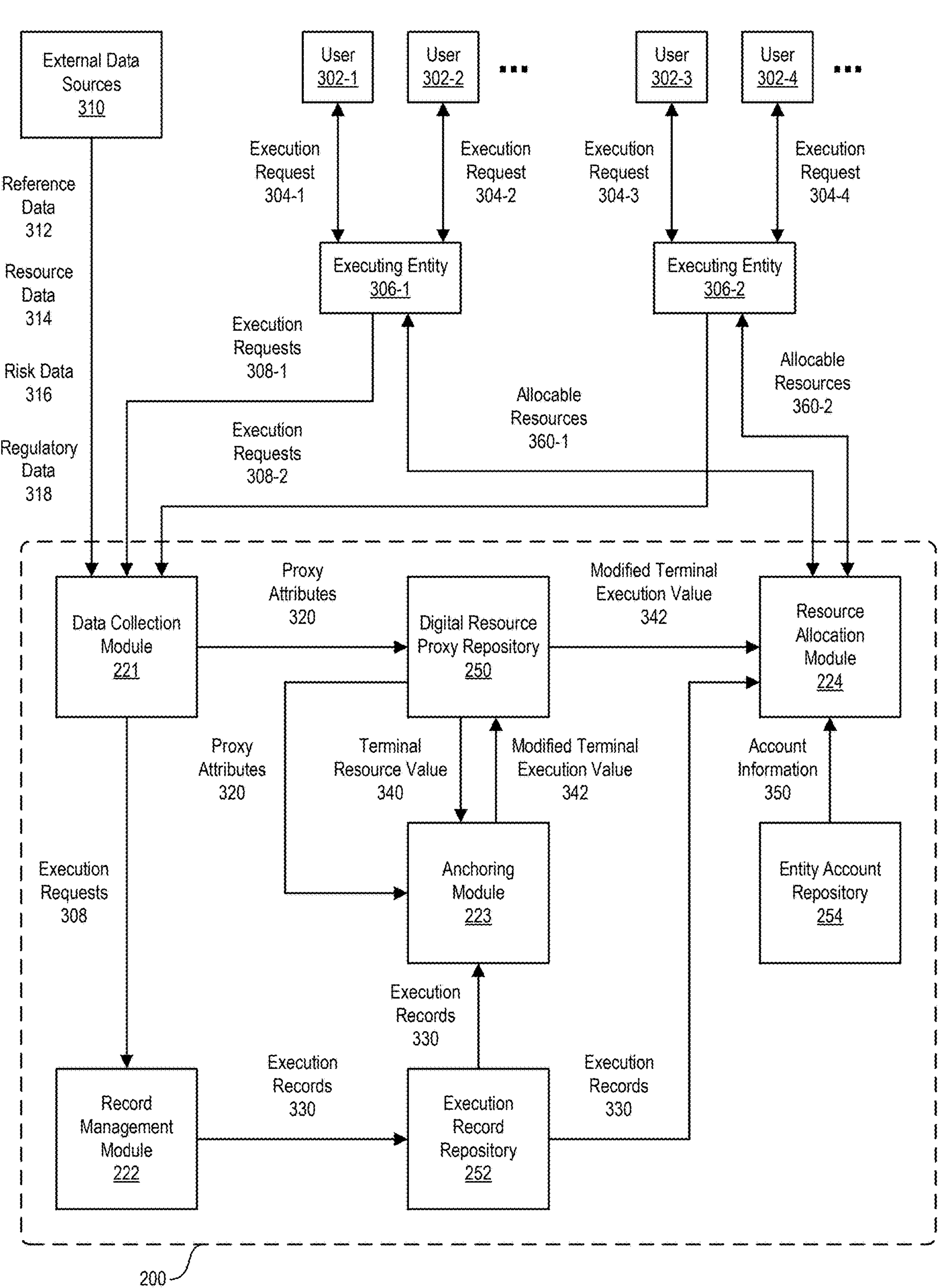
FIG. 3 is a block diagram that illustrates aspects of the digital anchoring system in accordance with some implementations of the disclosed technology.

FIG. 3 is a block diagram that illustrates aspects of the digital anchoring system in accordance with some implementations of the disclosed technology. The digital anchoring system 200 processes digital resource proxies (e.g., futures contracts, perpetual futures, contracts for differences (CFDs), options contracts, and/or the like) through interconnected computational modules and data pathways. The system architecture enables real-time data acquisition from external sources through secure API connections, processes execution requests via multi-threaded request handlers, and performs mathematical calculations to determine appropriate anchoring parameters. The system implements distributed database structures for storing execution records, maintains separate repositories for digital resource proxy specifications, and utilizes parallel processing techniques to handle concurrent operations. The computational components execute complex algorithms for price alignment, resource allocation, and settlement procedures while interfacing with existing financial infrastructure through standardized protocols.

In some implementations, the data collection module 221 within the memory 220 can serve as the primary interface between the digital anchoring system 200 and external data sources 310. The data collection module 221 can establish secure network connections (e.g., SSL/TLS encrypted connections, VPN tunnels, dedicated leased lines, and/or the like) with multiple external data providers to continuously receive and process incoming data streams. These external data sources 310 can include market data feeds, regulatory reporting systems, economic indicators, and other relevant information sources. The data collection module 221 can implement advanced data parsing and normalization algorithms to convert incoming data into a standardized format compatible with the internal processing requirements of the digital anchoring system 200. For example, the data collection module 221 can receive real-time price quotes for various standard resource units from multiple exchanges, normalize the timestamps to a common time zone (e.g., UTC), and convert all price data to a uniform decimal precision. The data collection module 221 can also implement sophisticated error detection and correction mechanisms to identify and handle data anomalies, such as outlier prices or temporary feed disruptions. Additionally, the data collection module 221 can maintain a local cache of recently received data to minimize latency for frequently accessed information and reduce the load on external data sources.

In some implementations, the data collection module 221 can process and categorize incoming data from external data sources 310 into distinct types of information, including reference data 312, resource data 314, risk data 316, and regulatory data 318. Reference data 312 can include fundamental information about digital resource proxies and their underlying standard resource units, such as contract specifications, trading hours, and identifier codes. The data collection module 221 can update the reference data 312 in real-time as changes occur, ensuring that all components of the digital anchoring system 200 operate with the most current information. Resource data 314 can encompass real-time and historical price information, trading volumes, and order book depths for both digital resource proxies and their corresponding standard resource units. The data collection module 221 can implement high-performance time-series databases and in-memory caching systems to efficiently store and retrieve large volumes of resource data 314, enabling rapid calculations and analysis. Risk data 316 can include market volatility measures, correlation coefficients, and other statistical indicators used for risk assessment and management. The data collection module 221 can calculate and update risk metrics in real-time based on incoming market data, utilizing parallel processing techniques to handle complex computations for multiple assets simultaneously. Regulatory data 318 can comprise information related to compliance requirements, reporting obligations, and regulatory changes affecting digital resource proxies. The data collection module 221 can integrate with regulatory reporting systems and implement automated checks to ensure that all operations of the digital anchoring system 200 remain compliant with current regulations.

In some implementations, the record management module 222 within the memory 220 can process execution requests 308 received from executing entities 306. The executing entities 306 represent futures commission merchants (FCMs), clearing members, broker-dealers, and similar financial institutions that serve as intermediaries between individual traders or institutional investors and the derivatives exchange infrastructure. These executing entities 306 aggregate orders from multiple users, manage client margin accounts, provide market access services, and handle regulatory compliance requirements. They collect execution requests from end users, perform preliminary risk checks, and then transmit these requests to the digital anchoring system 200 for processing and settlement. The executing entities 306 maintain accounts at clearinghouses that hold positions and collateral on behalf of their customers (e.g., omnibus client accounts), enabling efficient netting of offsetting positions and centralized risk management. The record management module 222 can implement a multi-threaded request handling system capable of processing thousands of execution requests 308 per second with minimal latency. When an execution request 304-1, execution request 304-2, execution request 304-3, or execution request 304-4 is received from a user 302-1, user 302-2, user 302-3, or user 302-4 respectively, the executing entities 306 (e.g., first executing entity 306-1 and second executing entity 306-2) aggregate these individual requests into consolidated execution requests 308 (e.g., execution requests 308-1 and execution requests 308-2) before transmitting them to the record management module 222. This aggregation process allows the executing entities 306 to efficiently batch multiple user requests, perform preliminary risk assessments, and optimize order flow before submission. Upon receiving these consolidated execution requests 308, the record management module 222 can perform a series of validation checks to ensure the requests comply with all relevant rules and constraints. These checks can include verifying the user's account status, available margin, position limits, and any applicable trading restrictions. The record management module 222 can then create a new execution record or update an existing one in the execution record repository 252, capturing all relevant details of the transaction. For example, when processing a futures contract order, the record management module 222 can generate an execution record that includes the contract identifier, order type (e.g., market order, limit order, stop order), quantity, price, timestamp, and associated user and executing entity information. The record management module 222 can also implement sophisticated matching algorithms to pair buy and sell orders, ensuring efficient execution of trades while maintaining fairness and transparency in the market.

In some implementations, the anchoring module 223 within the memory 220 can process execution records 330 stored in the execution record repository 252 along with proxy attributes 320 from the digital resource proxy repository 250 to generate modified terminal execution values 342 for digital resource proxies. The anchoring module 223 can implement complex mathematical models and statistical analysis techniques to calculate appropriate anchoring parameters based on observed market conditions and predefined rules. For example, when processing a futures contract at the end of a trading day, the anchoring module 223 can retrieve the contract's execution records 330 for that day, calculate a volume-weighted average price (VWAP) to determine the terminal execution value, and compare this value to the terminal resource value 340 of the underlying standard resource unit. The anchoring module 223 can then generate an anchoring parameter (e.g., a synthetic funding rate) based on the observed price deviation and apply this parameter to adjust the terminal execution value, resulting in a modified terminal execution value 342.

As an illustrative example, the anchoring module 223 can calculate the anchoring parameter using a standardized formula that quantifies the deviation between the terminal execution value and the terminal resource value. The general formula can be expressed as: Anchoring Parameter=(Terminal Execution Value−Terminal Resource Value)/Terminal Execution Value. This formula produces a ratio or percentage that represents the relative difference between the two values, which can then be applied to adjust the terminal execution value. As a simple example, if the terminal execution value (end-of-day futures settlement price) is $75.00 and the terminal resource value (e.g., end-of-day spot price) is $73.50, the anchoring parameter can be calculated as an adjustment ratio: (terminal execution value−terminal resource value)/terminal execution value=($75.00−$73.50)/$75.00=$1.50/$75.00=0.02 or 2%. This anchoring parameter can then be applied to adjust the terminal execution value to create the modified terminal execution value that better aligns with the underlying resource. This process can be repeated for each active digital resource proxy in the system, with the anchoring module 223 utilizing parallel processing techniques to handle multiple contracts, or batches of contracts (e.g., net contractual exposure of executing entities 306), simultaneously. In additional or alternative implementations, the anchoring module 223 can also implement adaptive algorithms that adjust the calculation of anchoring parameters based on historical performance and market conditions, optimizing the alignment between digital resource proxies and their underlying standard resource units over time.

In some implementations, the resource allocation module 224 within the memory 220 can process modified terminal execution values 342 generated by the anchoring module 223 to determine and distribute allocable resources 360-1 and allocable resources 360-2 among participating entities. The resource allocation module 224 can implement sophisticated allocation algorithms that consider multiple factors, including position sizes, margin requirements, and risk exposures, to calculate appropriate resource distributions. For example, when processing the settlement of a futures contract, the resource allocation module 224 can compare the modified terminal execution value 342 to the previous settlement price, calculate the resulting profit or loss for each position holder, and determine the corresponding variation margin payments or receipts. The resource allocation module 224 can then update account information 350 stored in the entity account repository 254, adjusting balances and recording transaction histories for all affected entities. Additionally, the resource allocation module 224 can implement real-time risk management functions, continuously monitoring account statuses and triggering margin calls or position liquidations when necessary to maintain system stability and protect against potential defaults.

In some implementations, the digital resource proxy repository 250 within the computing database 204 can store and manage comprehensive information about all digital resource proxies supported by the digital anchoring system 200. The digital resource proxy repository 250 can implement a sophisticated data model that captures all relevant attributes of each proxy, including contract specifications, current market status, and historical performance metrics. For example, the digital resource proxy repository 250 can store proxy attributes 320 such as contract size, tick size, expiration dates, settlement procedures, and associated fees for each digital resource proxy. The repository can also maintain real-time market data, including current prices, trading volumes, and open interest, which can be rapidly accessed by other components of the system. The digital resource proxy repository 250 can implement advanced indexing and caching mechanisms to optimize query performance, enabling fast retrieval of proxy information even under high-load conditions. Additionally, the repository can support versioning and audit trails, allowing the system to track changes in proxy attributes over time and maintain a complete historical record for compliance and analysis purposes.

In some implementations, the execution record repository 252 within the computing database 204 can store and manage detailed records of all transactions and activities related to digital resource proxies within the system. The execution record repository 252 can implement a high-performance, distributed database architecture capable of handling millions of execution records 330 per day while maintaining sub-millisecond query response times. Each execution record 330 can capture comprehensive information about a transaction, including unique identifiers, timestamps, involved parties, order details, execution prices, and associated fees. The execution record repository 252 can implement advanced compression algorithms specifically designed for financial data to minimize storage requirements while preserving data fidelity. For example, the repository can use delta encoding techniques to efficiently store time-series data, such as price and volume information, by recording only the changes from previous values rather than storing complete records for each update. The execution record repository 252 can also implement sophisticated indexing strategies, such as multi-dimensional indexes and bitmap indexes, to optimize query performance for complex analytical operations. Additionally, the repository can support real-time data replication and backup mechanisms to ensure data integrity and availability in the event of system failures or disasters.

In some implementations, the entity account repository 254 within the computing database 204 can store and manage comprehensive account information 350 for all participants in the digital anchoring system 200. The entity account repository 254 can implement a multi-tenant database architecture that ensures data isolation and security while allowing efficient access and updates to account information. For each entity, the repository can maintain detailed records of account balances, margin deposits, open positions, trading histories, and risk profiles. The entity account repository 254 can implement real-time update mechanisms to ensure that account information 350 remains current as transactions occur and market conditions change. For example, when a new trade is executed, the repository can immediately update the affected accounts' balances and position information, recalculate margin requirements, and adjust risk metrics. The entity account repository 254 can also implement sophisticated access control mechanisms, using role-based permissions and encryption to protect sensitive account information from unauthorized access or modification. Additionally, the repository can support complex querying capabilities, enabling the system to perform advanced analytics and generate detailed reports for risk management, compliance, and operational purposes.

Figure 4A:
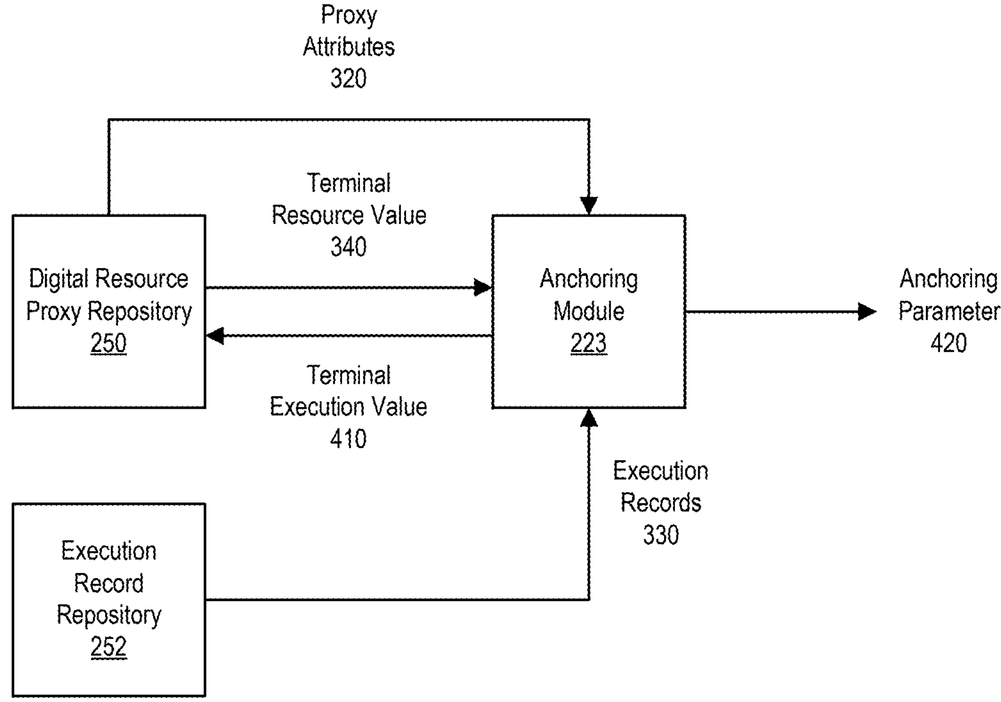
FIGS. 4A-4B are block diagrams that illustrate an anchoring mechanism in accordance with some implementations of the disclosed technology.
Figure 4B:
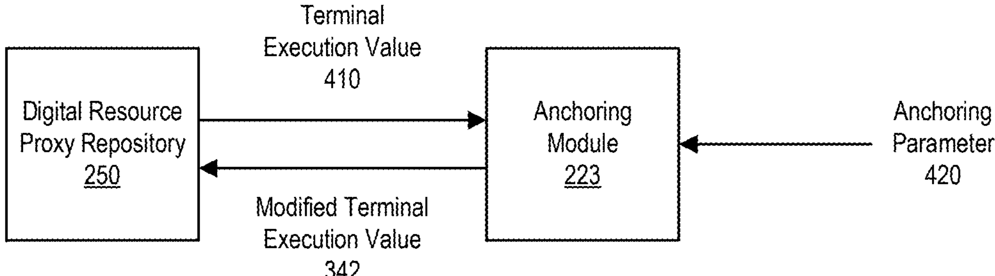

FIGS. 4A-4B are block diagrams that illustrate an anchoring mechanism in accordance with some implementations of the disclosed technology. The anchoring module 223 can process various inputs to generate an anchoring parameter and a modified terminal execution value for digital resource proxies (e.g., futures contracts, perpetual futures, contracts for difference (CFDs), options contracts, and/or the like). The anchoring module 223 can include a series of interconnected computational components designed to analyze market data, calculate deviations, and apply adjustments to maintain alignment between digital resource proxies and their underlying standard resource units (e.g., commodities, cryptocurrencies, equity indices, foreign exchange rates, and/or the like). In some implementations, the anchoring module 223 can implement advanced statistical algorithms and/or machine learning models to dynamically adapt its anchoring mechanisms based on changing market conditions and historical performance data. For example, the anchoring module 223 can utilize a multi-layer neural network trained on historical price data to predict short-term price movements and optimize the calculation of anchoring parameters. Additionally, the anchoring module 223 can employ parallel processing techniques to handle multiple digital resource proxies simultaneously, enabling efficient computation of anchoring parameters across a diverse portfolio of assets.

In some implementations, the anchoring module 223 can retrieve proxy attributes 320 from the digital resource proxy repository 250 to obtain essential information about each digital resource proxy being processed. The proxy attributes 320 can include detailed specifications of the digital resource proxy (e.g., contract size, tick size, expiration date, settlement procedures, and/or the like) that are crucial for accurate anchoring calculations. The anchoring module 223 can implement a high-performance caching system to store frequently accessed proxy attributes 320, minimizing latency in data retrieval and improving overall processing speed. For example, the anchoring module 223 can utilize a distributed cache (e.g., Redis, Memcached, Apache Ignite, and/or the like) to maintain an in-memory representation of proxy attributes 320 for active digital resource proxies, enabling near-instantaneous access during anchoring calculations. The anchoring module 223 can also implement a dynamic update mechanism to ensure that the cached proxy attributes 320 remain synchronized with the digital resource proxy repository 250, automatically refreshing the cache when changes occur in the underlying data store.

In some implementations, the anchoring module 223 can process execution records 330 from the execution record repository 252 to analyze recent trading activity and market dynamics for each digital resource proxy. The execution records 330 can provide a comprehensive history of transactions (e.g., trade prices, volumes, timestamps, and/or the like) that the anchoring module 223 can use to calculate various statistical measures and identify trends. The anchoring module 223 can implement sophisticated time-series analysis techniques to extract meaningful patterns from the execution records 330 and inform the anchoring parameter calculation process. For example, the anchoring module 223 can apply autoregressive integrated moving average (ARIMA) models to historical price data extracted from execution records 330 to forecast short-term price movements and adjust anchoring parameters accordingly. Additionally, the anchoring module 223 can utilize advanced data visualization techniques (e.g., candlestick charts, heatmaps, and/or the like) to represent execution records 330 graphically, enabling rapid identification of anomalies or significant market events that may impact the anchoring process.

In some implementations, the anchoring module 223 can determine a terminal resource value 340 for the standard resource unit associated with each digital resource proxy.

The terminal resource value 340 can represent the current market price or valuation of the underlying asset (e.g., spot price, index value, reference rate, and/or the like) at the end of a specified time interval (e.g., trading day, funding period, settlement window, and/or the like). The anchoring module 223 can implement real-time data processing pipelines to continuously update and refine the terminal resource value 340 based on incoming market data from external sources. For example, the anchoring module 223 can utilize a custom-built, low-latency market data feed handler to process high-frequency price updates for commodities, cryptocurrencies, and other standard resource units, ensuring that the terminal resource value 340 accurately reflects the most current market conditions. The anchoring module 223 can also implement sophisticated outlier detection algorithms to identify and filter out erroneous or manipulated price data, enhancing the reliability of the terminal resource value 340 calculation.

In some implementations, the anchoring module 223 can calculate a terminal execution value 410 for each digital resource proxy based on the execution records 330 and current market conditions. The terminal execution value 410 can represent the final settlement price or valuation of the digital resource proxy (e.g., futures contract closing price, perpetual future mark price, CFD closing level, and/or the like) at the end of the specified time interval. The anchoring module 223 can implement various pricing models and valuation techniques to determine the terminal execution value 410, taking into account factors such as trading volume, order book depth, and recent price movements. For example, the anchoring module 223 can utilize a volume-weighted average price (VWAP) algorithm to calculate the terminal execution value 410 for a futures contract, considering all trades executed within a defined time window and weighting them based on their respective volumes. Additionally, the anchoring module 223 can implement a sophisticated mark-to-market process for products similar to CFDs and perpetual futures, continuously updating the terminal execution value 410 based on the prevailing funding rate and index price to maintain alignment with the underlying asset.

In some implementations, the anchoring module 223 can generate an anchoring parameter 420 based on the detected deviation between the terminal resource value 340 and the terminal execution value 410. As a first example, the anchoring parameter 420 can be calculated as a simple difference ratio: (terminal execution value−terminal resource value)/terminal execution value. This ratio directly quantifies the percentage deviation between the two values, providing a straightforward measure for adjustment. This simple approach represents one way the anchoring parameter 420 can serve as a quantitative measure of the misalignment between the digital resource proxy and its underlying standard resource unit, guiding the subsequent adjustment process. In some implementations, the anchoring module 223 can implement advanced mathematical models and optimization algorithms to calculate the anchoring parameter 420, considering factors such as historical price relationships, market volatility, and liquidity conditions. For example, the anchoring module 223 can utilize a dynamic Bayesian network to model the complex relationships between various market factors and determine the optimal anchoring parameter 420 that minimizes the expected deviation over time. The anchoring module 223 can also implement adaptive learning algorithms that continuously refine the anchoring parameter 420 calculation based on observed market behavior and the effectiveness of previous adjustments.

In some implementations, the anchoring module 223 can apply the anchoring parameter 420 to the terminal execution value 410 to generate a modified terminal execution value 342 for each digital resource proxy. The modified terminal execution value 342 can represent the adjusted settlement price or valuation of the digital resource proxy after the anchoring mechanism has been applied, aligning it more closely with the terminal resource value 340 of the underlying standard resource unit. The anchoring module 223 can implement sophisticated numerical methods and iterative algorithms to apply the anchoring parameter 420 in a way that ensures smooth convergence and minimizes market disruption. For example, the anchoring module 223 can utilize a gradient descent optimization technique to incrementally adjust the terminal execution value 410 towards the terminal resource value 340, using the anchoring parameter 420 as a step size modifier. Additionally, the anchoring module 223 can implement circuit breaker mechanisms and volatility controls to prevent excessive adjustments in cases of extreme market conditions, ensuring that the modified terminal execution value 342 remains within acceptable bounds.

In some implementations, the anchoring module 223 can store the modified terminal execution value 342 in the digital resource proxy repository 250, updating the current valuation of the digital resource proxy for use in subsequent processing steps. The anchoring module 223 can implement a transactional update mechanism to ensure data consistency and integrity when modifying the digital resource proxy repository 250. For example, the anchoring module 223 can utilize a two-phase commit protocol to coordinate the update process across multiple database nodes, ensuring that all related data (e.g., execution records, account balances, and/or the like) is updated atomically. The anchoring module 223 can also implement a comprehensive logging and audit trail system to record all modifications to the digital resource proxy repository 250, enabling detailed analysis of the anchoring process and facilitating regulatory compliance.

FIGS. 5A-5B are block diagrams that illustrate example product specifications for sample digital resource proxies in accordance with some implementations of the disclosed technology. The digital anchoring system 200 can process and manage digital resource proxies (e.g., futures contracts, perpetual futures, contracts for difference (CFDs), options contracts, and/or the like) with specific product specifications tailored to different underlying standard resource units (e.g., commodities, cryptocurrencies, equity indices, foreign exchange rates, and/or the like). The digital resource proxy repository 250 within the computing database 204 can store comprehensive information about these digital resource proxies, including detailed contract specifications and parameters that define their characteristics and behavior within the financial market infrastructure. For example, FIG. 5A illustrates a first example digital resource proxy 502 representing an oil futures contract, while FIG. 5B depicts a second example digital resource proxy 504 for a Bitcoin futures contract. These examples demonstrate how the digital anchoring system 200 can accommodate diverse asset classes with distinct specifications while maintaining a standardized framework for processing and settlement.

In some implementations, a product field 510 within the first example digital resource proxy 502 and the second example digital resource proxy 504 can specify the underlying standard resource unit associated with each digital resource proxy. The product field 510 can be a fundamental attribute that identifies the specific asset or instrument being traded through the digital resource proxy. For example, in FIG. 5A, the product field 510 indicates "Oil Contract," while in FIG. 5B, the product field 510 specifies "Bitcoin Contract." The data collection module 221 can utilize the information stored in the product field 510 to retrieve and process relevant market data (e.g., spot prices, trading volumes, order book depths, and/or the like) for the specified standard resource unit. The anchoring module 223 can reference the product field 510 when calculating terminal resource values 340 and determining appropriate anchoring parameters 420 for each digital resource proxy. Additionally, the resource allocation module 224 can use the product field 510 to apply asset-specific risk management rules and margin requirements when managing allocable resources 360-1 and allocable resources 360-2 associated with different digital resource proxies.

In some implementations, a product type field 512 within the first example digital resource proxy 502 and the second example digital resource proxy 504 can define the structural characteristics and financial behavior of each digital resource proxy. The product type field 512 can specify the fundamental nature of the contract (e.g., linear derivative, non-linear derivative, cash-settled instrument, physically settled instrument, and/or the like) and its intended duration or maturity profile. For instance, both the first example digital resource proxy 502 and the second example digital resource proxy 504 are classified as "Linear Long Maturity Derivative (Cash-Settled)" in their respective product type fields 512. This classification indicates that these digital resource proxies exhibit a linear relationship between price movements of the underlying standard resource unit and the contract value, have an extended time horizon, and are settled financially rather than through physical delivery. The record management module 222 can utilize the information in the product type field 512 to determine appropriate execution record formats and storage structures within the execution record repository 252. The anchoring module 223 can reference the product type field 512 when selecting and applying suitable mathematical models for calculating anchoring parameters 420 and generating modified terminal execution values 342. Furthermore, the resource allocation module 224 can use the product type field 512 to implement specific risk assessment methodologies and capital allocation strategies tailored to the characteristics of each digital resource proxy type.

In some implementations, an expiration field 514 within the first example digital resource proxy 502 and the second example digital resource proxy 504 can specify the contractual lifespan of each digital resource proxy. The expiration field 514 can define the duration for which the digital resource proxy remains active and tradable within the digital anchoring system 200. As an illustrative example, both the first example digital resource proxy 502 and the second example digital resource proxy 504 have an expiration field 514 set to "10 Years," indicating a long-term contract duration. In additional or alternative implementations, the expiration field 514 can be set to a different and/or arbitrary contract durations (e.g., 1 year, 5 years, and/or the like). This extended timeframe can allow the digital resource proxies to fit into existing futures post-trade processing systems while providing market participants with extended exposure to the underlying standard resource units. The data collection module 221 can use the information in the expiration field 514 to determine relevant time horizons for gathering and analyzing market data related to each digital resource proxy. The record management module 222 can reference the expiration field 514 when organizing and indexing execution records 330 within the execution record repository 252, ensuring efficient retrieval of historical data throughout the contract's lifespan. The anchoring module 223 can utilize the expiration field 514 when calculating term structures and forward curves for determining appropriate anchoring parameters 420 over the entire duration of the digital resource proxy. Additionally, the resource allocation module 224 can use the expiration field 514 to implement time-based risk management strategies and adjust margin requirements as the digital resource proxy approaches its expiration date.

In some implementations, a trading hours field 516 within the first example digital resource proxy 502 and the second example digital resource proxy 504 can define the operational time windows during which each digital resource proxy can be actively traded and processed within the digital anchoring system 200. The trading hours field 516 can specify the exact days and times when market participants can submit execution requests 308 and when the system components (e.g., data collection module 221, record management module 222, anchoring module 223, and/or the like) actively process and manage the digital resource proxies. For example, both the first example digital resource proxy 502 and the second example digital resource proxy 504 have a trading hours field 516 set to "Sunday 18:00 E.T. to Friday 17:00 E.T.," indicating nearly continuous trading availability throughout the week. In additional or alternative implementations, the trading hours field 516 can be set to different and/or arbitrary time intervals (e.g., 24/7 all day, 9:30 AM to 4:00 PM, and/or the like). This extended trading window can accommodate global market participants across different time zones and align with the 24/7 nature of certain underlying standard resource units (e.g., cryptocurrencies). The data collection module 221 can use the information in the trading hours field 516 to schedule and synchronize real-time data acquisition processes from external data sources 310, ensuring that relevant market information is continuously updated during active trading periods. The record management module 222 can reference the trading hours field 516 when timestamping and organizing execution records 330, maintaining accurate chronological order of transactions within the specified trading windows. The anchoring module 223 can utilize the trading hours field 516 to determine appropriate intervals for calculating and applying anchoring parameters 420, ensuring that the digital resource proxies remain aligned with their underlying standard resource units throughout the active trading periods. Furthermore, the resource allocation module 224 can use the trading hours field 516 to implement time-sensitive risk management procedures, such as intraday margin calls or position limit enforcement, during the specified trading hours.

In some implementations, a listed contracts field 518 within the first example digital resource proxy 502 and the second example digital resource proxy 504 can specify the number and nature of contract variations available for each digital resource proxy within the digital anchoring system 200. The listed contracts field 518 can define whether multiple contract specifications (e.g., different expiration dates, strike prices, or other variable terms) are offered for a given digital resource proxy or if a single, standardized contract is maintained. For example, both the first example digital resource proxy 502 and the second example digital resource proxy 504 have a listed contracts field 518 specifying "Single, Authoritative Contract," indicating that only one version of the contract is available for trading. This approach of offering a single, authoritative contract can simplify market structure, enhance liquidity concentration, and streamline processing within the digital anchoring system 200. The data collection module 221 can use the information in the listed contracts field 518 to focus data acquisition efforts on the specific contract parameters relevant to the single, authoritative version of each digital resource proxy. The record management module 222 can reference the listed contracts field 518 when organizing execution records 330 within the execution record repository 252, maintaining a clear and unambiguous transaction history for each digital resource proxy without the need for separate contract series or expiration cycles. The anchoring module 223 can utilize the listed contracts field 518 to apply consistent anchoring methodologies across all transactions related to a given digital resource proxy, as there are no variations in contract specifications to account for. Additionally, the resource allocation module 224 can use the listed contracts field 518 to implement uniform margin requirements and risk management procedures for all positions in a given digital resource proxy, simplifying the allocation of allocable resources 360-1 and allocable resources 360-2 among participating entities.

In some implementations, an index price field 520 within the first example digital resource proxy 502 and the second example digital resource proxy 504 can define the reference value mechanism used to determine the underlying market price for each digital resource proxy. The index price field 520 can specify the data source, calculation methodology, and update frequency for the benchmark price against which the digital resource proxy's value is measured and aligned. For example, the first example digital resource proxy 502 has an index price field 520 indicating that the price is "Derived via an Oil/USD index price that updates every second (reliable, real-time, latency)," while the second example digital resource proxy 504 specifies a "BTC/USD index price that updates every second." This high-frequency, real-time index price updating can enable precise tracking of the underlying standard resource unit's value and support accurate anchoring mechanisms. The data collection module 221 can use the information in the index price field 520 to establish and maintain low-latency connections with the specified index providers, ensuring that the digital anchoring system 200 receives up-to-date pricing information for each digital resource proxy. The record management module 222 can reference the index price field 520 when recording execution records 330, associating each transaction with the corresponding index price at the time of execution for subsequent analysis and settlement calculations. The anchoring module 223 can utilize the index price field 520 as a primary input for calculating terminal resource values 340 and determining appropriate anchoring parameters 420 to maintain alignment between the digital resource proxy and its underlying standard resource unit. Furthermore, the resource allocation module 224 can use the index price field 520 to perform real-time mark-to-market calculations, assess collateral requirements, and manage risk exposures based on the most current market valuations of each digital resource proxy.

In some implementations, a price example field 522 within the first example digital resource proxy 502 and the second example digital resource proxy 504 can provide a representative value illustrating the typical price range or order of magnitude for each digital resource proxy. The price example field 522 can offer a quick reference point for system components and market participants to understand the general pricing context of the digital resource proxy without the need for real-time data retrieval. For example, the first example digital resource proxy 502 has a price example field 522 showing "$73.83," while the second example digital resource proxy 504 displays "$69.35" in the price example field 522. These example prices can reflect recent or typical market values for the respective underlying standard resource units. The data collection module 221 can use the information in the price example field 522 as a baseline for validating incoming price data from external data sources 310, flagging potential anomalies or data feed issues if received prices deviate significantly from the expected range. The record management module 222 can reference the price example field 522 when performing sanity checks on execution records 330, ensuring that recorded transaction prices fall within reasonable bounds relative to the provided example. The anchoring module 223 can utilize the price example field 522 as a starting point for initializing price-based calculations or as a fallback value in scenarios where real-time market data is temporarily unavailable. Additionally, the resource allocation module 224 can use the price example field 522 to establish initial margin thresholds or to calibrate risk models in the absence of extensive historical price data for new or illiquid digital resource proxies.

In some implementations, a price quotation field 524 within the first example digital resource proxy 502 and the second example digital resource proxy 504 can specify the currency and unit of measurement used to express the value of each digital resource proxy. The price quotation field 524 can define the standardized format for representing prices across all system components and user interfaces within the digital anchoring system 200. For example, both the first example digital resource proxy 502 and the second example digital resource proxy 504 have a price quotation field 524 specifying "U.S. Dollars and Cents," with the additional clarification of "Per Barrel" for the oil contract and "Per Bitcoin" for the cryptocurrency contract. This standardized price quotation can ensure consistency in price representation and facilitate accurate calculations throughout the digital resource proxy lifecycle. The data collection module 221 can use the information in the price quotation field 524 to properly interpret and normalize incoming price data from various external data sources 310, converting all received prices to the specified currency and unit of measurement. The record management module 222 can reference the price quotation field 524 when formatting and storing execution records 330, ensuring that all recorded prices adhere to the standardized quotation format for each digital resource proxy. The anchoring module 223 can utilize the price quotation field 524 to maintain consistent units of measurement when calculating terminal resource values 340, terminal execution values 410, and modified terminal execution values 342, preventing potential errors or misalignments due to unit conversion issues. Furthermore, the resource allocation module 224 can use the price quotation field 524 to accurately assess the value of positions, calculate margin requirements, and manage allocable resources 360-1 and allocable resources 360-2 in a uniform currency across different digital resource proxies.

In some implementations, a contract unit field 526 within the first example digital resource proxy 502 and the second example digital resource proxy 504 can define the standardized quantity of the underlying standard resource unit represented by each digital resource proxy. The contract unit field 526 can specify the fixed amount of the asset or instrument that is bought or sold with each contract, establishing the fundamental relationship between the digital resource proxy and its underlying standard resource unit. For example, the first example digital resource proxy 502 has a contract unit field 526 specifying "1 Barrel," indicating that each oil futures contract represents a single barrel of oil. In contrast, the second example digital resource proxy 504 has a contract unit field 526 set to "1/1000 BTC," meaning that each Bitcoin futures contract represents one-thousandth of a Bitcoin. These contract unit specifications can determine the scale and granularity of trading within the digital anchoring system 200. The data collection module 221 can use the information in the contract unit field 526 to properly scale and interpret market data related to the underlying standard resource units, ensuring that price and volume information is correctly aligned with the contract specifications. The record management module 222 can reference the contract unit field 526 when processing execution requests 308 and generating execution records 330, accurately recording the quantity of the underlying asset involved in each transaction. The anchoring module 223 can utilize the contract unit field 526 to perform precise calculations when determining anchoring parameters 420 and generating modified terminal execution values 342, accounting for the specific quantity of the underlying asset represented by each digital resource proxy. Additionally, the resource allocation module 224 can use the contract unit field 526 to accurately assess position sizes, calculate notional values, and determine appropriate margin requirements based on the standardized quantity of the underlying asset represented by each contract.

In some implementations, a minimum order size field 528 within the first example digital resource proxy 502 and the second example digital resource proxy 504 can specify the smallest allowable trading increment for each digital resource proxy within the digital anchoring system 200. The minimum order size field 528 can define the lowest number of contracts that can be bought or sold in a single transaction, establishing a baseline for market participation and liquidity provision. For example, both the first example digital resource proxy 502 and the second example digital resource proxy 504 have a minimum order size field 528 set to "1 Contract," indicating that market participants can trade as little as one contract at a time. This low minimum order size can enhance accessibility and flexibility for a wide range of market participants, from small retail traders to large institutional investors while also enabling orders to be sent into existing systems. The data collection module 221 can use the information in the minimum order size field 528 to validate incoming market data, ensuring that reported trade sizes and book order entries comply with the specified minimum order size for each digital resource proxy. The record management module 222 can reference the minimum order size field 528 when processing execution requests 308, rejecting or flagging any orders that do not meet the minimum size requirement before generating execution records 330. The anchoring module 223 can utilize the minimum order size field 528 to calibrate its calculations and adjustments, ensuring that any modifications to terminal execution values 410 or generation of modified terminal execution values 342 respect the granularity imposed by the minimum order size. Furthermore, the resource allocation module 224 can use the minimum order size field 528 to implement appropriate risk management procedures and margin calculations, accounting for the smallest possible position size that a market participant can hold in each digital resource proxy.

In some implementations, a quote increment field 530 within the first example digital resource proxy 502 and the second example digital resource proxy 504 can define the smallest allowable price movement for each digital resource proxy within the digital anchoring system 200. The quote increment field 530, also known as the tick size, can specify the minimum price difference between consecutive price levels at which the digital resource proxy can be quoted or traded. For example, both the first example digital resource proxy 502 and the second example digital resource proxy 504 have a quote increment field 530 set to "$0.01," indicating that prices can move in one-cent increments. This fine-grained price resolution can enable precise price discovery and tight bid-ask spreads, potentially enhancing market efficiency and liquidity while mapping within existing systems. The data collection module 221 can use the information in the quote increment field 530 to validate and normalize incoming price data from external data sources 310, ensuring that all received prices adhere to the specified tick size for each digital resource proxy. The record management module 222 can reference the quote increment field 530 when processing execution requests 308 and generating execution records 330, rounding or rejecting any orders with prices that do not align with the allowed price increments. The anchoring module 223 can utilize the quote increment field 530 to ensure that all calculations involving terminal resource values 340, terminal execution values 410, and modified terminal execution values 342 respect the minimum price movement allowed for each digital resource proxy. Additionally, the resource allocation module 224 can use the quote increment field 530 to implement precise pricing in margin calculations, position valuations, and risk assessments, accounting for the smallest possible price changes that can affect the value of allocable resources 360-1 and allocable resources 360-2 associated with each digital resource proxy.

In some implementations, a minimum price fluctuation field 532 within the first example digital resource proxy 502 and the second example digital resource proxy 504 can specify the smallest allowable price change for each digital resource proxy within the digital anchoring system 200. The minimum price fluctuation field 532 can define the monetary value associated with the smallest price movement, often corresponding to the quote increment or tick size. For example, both the first example digital resource proxy 502 and the second example digital resource proxy 504 have a minimum price fluctuation field 532 set to "$0.01," aligning with their respective quote increment fields 530. This specification ensures that all price movements and calculations within the system adhere to a consistent minimum value change in a compatible process accessible to existing systems. The data collection module 221 can use the information in the minimum price fluctuation field 532 to validate and process incoming market data, ensuring that reported price changes comply with the specified minimum fluctuation for each digital resource proxy. The record management module 222 can reference the minimum price fluctuation field 532 when generating and storing execution records 330, accurately capturing price changes in accordance with the allowed minimum fluctuation. The anchoring module 223 can utilize the minimum price fluctuation field 532 to ensure that all calculations involving terminal resource values 340, terminal execution values 410, and the generation of modified terminal execution values 342 respect the smallest allowable price change for each digital resource proxy. Furthermore, the resource allocation module 224 can use the minimum price fluctuation field 532 to implement precise financial calculations, such as determining the monetary impact of price movements on margin requirements, position valuations, and the allocation of allocable resources 360-1 and allocable resources 360-2 among market participants.

In some implementations, an initial margin field 534 within the first example digital resource proxy 502 and the second example digital resource proxy 504 can specify the upfront collateral requirement for opening a position in each digital resource proxy within the digital anchoring system 200. The initial margin field 534 can define the minimum amount of allocable resources (e.g., cash, securities, other eligible assets, and/or the like) that a market participant must deposit to initiate a trade. For example, both the first example digital resource proxy 502 and the second example digital resource proxy 504 have an initial margin field 534 marked as "TBD" (To Be Determined), indicating that the specific margin requirements are subject to further definition or may be dynamically adjusted based on market conditions and regulatory considerations. The data collection module 221 can use the information in the initial margin field 534 to gather and analyze relevant market data (e.g., historical volatility, liquidity metrics, regulatory guidelines, and/or the like) that may influence the determination of appropriate initial margin levels. The record management module 222 can reference the initial margin field 534 when processing execution requests 308, ensuring that market participants have sufficient collateral before generating execution records 330 for new positions. The anchoring module 223 can utilize the initial margin field 534 as a factor in its calculations, potentially adjusting anchoring parameters 420 or modified terminal execution values 342 to account for the impact of margin requirements on market dynamics. Additionally, the resource allocation module 224 can use the initial margin field 534 to implement risk management procedures, calculate required collateral deposits, and manage the allocation of allocable resources 360-1 and allocable resources 360-2 among market participants based on their open positions and the associated initial margin requirements.

In some implementations, a maintenance margin field 536 within the first example digital resource proxy 502 and the second example digital resource proxy 504 can specify the minimum collateral level that must be maintained for existing positions in each digital resource proxy within the digital anchoring system 200. The maintenance margin field 536 can define the threshold below which a market participant's account equity must not fall to avoid margin calls or forced liquidations. For example, both the first example digital resource proxy 502 and the second example digital resource proxy 504 have a maintenance margin field 536 marked as "TBD" (To Be Determined), indicating that the specific maintenance margin requirements are subject to further definition or may be dynamically adjusted based on market conditions and risk management considerations. The data collection module 221 can use the information in the maintenance margin field 536 to monitor and analyze relevant market data (e.g., price volatility, liquidity conditions, correlation metrics, and/or the like) that may influence the determination of appropriate maintenance margin levels. The record management module 222 can reference the maintenance margin field 536 when updating execution records 330, flagging positions that may be approaching or breaching the maintenance margin threshold. The anchoring module 223 can utilize the maintenance margin field 536 as a factor in its calculations, potentially adjusting anchoring parameters 420 or modified terminal execution values 342 to account for the impact of margin requirements on market stability and participant behavior. Furthermore, the resource allocation module 224 can use the maintenance margin field 536 to implement ongoing risk management procedures, calculate margin call thresholds, and manage the reallocation of allocable resources 360-1 and allocable resources 360-2 among market participants based on their current position values relative to the specified maintenance margin requirements.

In some implementations, a settlement method field 538 within the first example digital resource proxy 502 and the second example digital resource proxy 504 can specify the process by which obligations associated with each digital resource proxy are fulfilled at expiration or during intermediate settlement periods within the digital anchoring system 200. The settlement method field 538 can define whether the contract is settled through physical delivery of the underlying standard resource unit or through financial cash settlement based on the final price of the contract. For example, both the first example digital resource proxy 502 and the second example digital resource proxy 504 have a settlement method field 538 indicating "Financially Cash-Settled," meaning that no physical delivery of oil or Bitcoin occurs, and all obligations are resolved through monetary transfers. This cash settlement approach can simplify the settlement process and eliminate the need for physical delivery infrastructure. The data collection module 221 can use the information in the settlement method field 538 to gather and process relevant market data (e.g., spot prices, futures prices, interest rates, and/or the like) required for accurate cash settlement calculations. The record management module 222 can reference the settlement method field 538 when generating and updating execution records 330, ensuring that all transactions are properly categorized and processed according to the specified settlement method. The anchoring module 223 can utilize the settlement method field 538 to tailor its calculations of terminal resource values 340, terminal execution values 410, and modified terminal execution values 342, accounting for any specific considerations related to cash settlement procedures. Additionally, the resource allocation module 224 can use the settlement method field 538 to implement appropriate settlement workflows, calculate final settlement amounts, and manage the transfer of allocable resources 360-1 and allocable resources 360-2 among market participants based on their positions at settlement time.

In some implementations, a settlement procedures field 540 within the first example digital resource proxy 502 and the second example digital resource proxy 504 can define the specific processes and timelines for resolving outstanding positions and determining final settlement values for each digital resource proxy within the digital anchoring system 200. The settlement procedures field 540 can provide detailed information about how and when settlement calculations are performed, how settlement prices are determined, and how the resulting obligations are fulfilled. For example, both the first example digital resource proxy 502 and the second example digital resource proxy 504 have a settlement procedures field 540 specifying that "There is one end of day settlement price set by the Exchange to mark account values. This end of day settlement price is set to the index price daily. At maturity, the contract is cash-settled to the value of the index price." This approach ensures consistent daily valuation of positions while aligning the final settlement with the underlying index price. The data collection module 221 can use the information in the settlement procedures field 540 to schedule and prioritize the collection of relevant market data (e.g., index prices, trading activity, and/or the like) required for daily and final settlement calculations. The record management module 222 can reference the settlement procedures field 540 when processing and updating execution records 330, ensuring that all transactions are properly valued and settled according to the specified procedures. The anchoring module 223 can utilize the settlement procedures field 540 to synchronize its calculations of terminal resource values 340, terminal execution values 410, and modified terminal execution values 342 with the daily settlement process, ensuring that the anchoring mechanism aligns with the exchange-set settlement prices. Furthermore, the resource allocation module 224 can use the settlement procedures field 540 to implement daily mark-to-market processes, calculate variation margin requirements, and manage the allocation of allocable resources 360-1 and allocable resources 360-2 based on the daily settlement prices and final cash settlement values determined according to the specified procedures.

In some implementations, a floating price field 542 within the first example digital resource proxy 502 and the second example digital resource proxy 504 can specify whether the digital resource proxy incorporates a variable pricing component that fluctuates based on predefined market factors or indices. The floating price field 542 can define the mechanism, if there is any, by which the contract price adjusts over time in response to changes in underlying market conditions or reference rates. For example, both the first example digital resource proxy 502 and the second example digital resource proxy 504 have a floating price field 542 indicating "N/A" (Not Applicable), suggesting that these contracts do not incorporate a floating price component and instead rely on fixed or market-determined prices. This absence of a floating price mechanism can simplify contract valuation and risk management processes within the digital anchoring system 200. The data collection module 221 can use the information in the floating price field 542 to determine which market data streams and external references are relevant for pricing and valuation calculations. The record management module 222 can reference the floating price field 542 when processing execution requests 308 and generating execution records 330, ensuring that all transactions are recorded with the appropriate price type (fixed or floating) for each digital resource proxy. The anchoring module 223 can utilize the floating price field 542 to tailor its calculation methodologies for terminal resource values 340, terminal execution values 410, and modified terminal execution values 342, accounting for the presence or absence of floating price components in each digital resource proxy. Additionally, the resource allocation module 224 can use the floating price field 542 to implement appropriate risk management strategies, margin calculation methods, and allocation procedures for allocable resources 360-1 and allocable resources 360-2, considering the specific pricing characteristics of each digital resource proxy.

In some implementations, a product code field 544 within the first example digital resource proxy 502 and the second example digital resource proxy 504 can specify a unique identifier assigned to each digital resource proxy within the digital anchoring system 200. The product code field 544 can provide a standardized reference that can be used across various system components, external interfaces, and market data feeds to unambiguously identify and track specific digital resource proxies. For example, both the first example digital resource proxy 502 and the second example digital resource proxy 504 have a product code field 544 marked as "TBD" (To Be Determined), indicating that the specific product codes are yet to be assigned or may be subject to regulatory approval or industry standardization processes. The data collection module 221 can use the information in the product code field 544 to efficiently organize and categorize incoming market data, ensuring that all relevant information is correctly associated with the appropriate digital resource proxy. The record management module 222 can reference the product code field 544 when generating and indexing execution records 330, facilitating rapid retrieval and analysis of transaction data for specific digital resource proxies. The anchoring module 223 can utilize the product code field 544 to maintain separate calculation streams and anchoring parameters 420 for each unique digital resource proxy, ensuring that the anchoring process is tailored to the specific characteristics of each contract. Furthermore, the resource allocation module 224 can use the product code field 544 to implement product-specific risk management rules, margin requirements, and allocation procedures for allocable resources 360-1 and allocable resources 360-2, allowing for customized treatment of different digital resource proxies within the system.

In some implementations, a position limits field 546 within the first example digital resource proxy 502 and the second example digital resource proxy 504 can specify the maximum number of contracts or notional value that a single market participant or group of related participants can hold in each digital resource proxy within the digital anchoring system 200. The position limits field 546 can define restrictions on the size of positions that can be accumulated, helping to prevent market manipulation and manage systemic risk. For example, both the first example digital resource proxy 502 and the second example digital resource proxy 504 have a position limits field 546 marked as "TBD" (To Be Determined), indicating that the specific position limits are subject to further definition or may be dynamically adjusted based on market conditions and regulatory requirements. The data collection module 221 can use the information in the position limits field 546 to monitor and analyze market concentration data, identifying potential breaches of position limits across multiple participants or related accounts. The record management module 222 can reference the position limits field 546 when processing execution requests 308, flagging or rejecting orders that would result in positions exceeding the specified limits before generating execution records 330. The anchoring module 223 can utilize the position limits field 546 as a factor in its calculations, potentially adjusting anchoring parameters 420 or modified terminal execution values 342 to account for the impact of position limits on market dynamics and liquidity. Additionally, the resource allocation module 224 can use the position limits field 546 to implement risk management procedures, calculate exposure levels, and manage the allocation of allocable resources 360-1 and allocable resources 360-2 among market participants based on their current positions relative to the specified limits for each digital resource proxy.

In some implementations, an exchange rulebook field 548 within the first example digital resource proxy 502 and the second example digital resource proxy 504 can specify the status and availability of comprehensive trading rules and regulations governing each digital resource proxy within the digital anchoring system 200. The exchange rulebook field 548 can indicate whether a formal set of rules has been established, approved, and published for market participants to reference when trading the digital resource proxy. For example, both the first example digital resource proxy 502 and the second example digital resource proxy 504 have an exchange rulebook field 548 indicating "Drafted," suggesting that a set of rules has been prepared but may still be subject to final review, approval, or implementation. The data collection module 221 can use the information in the exchange rulebook field 548 to ensure that data collection and processing procedures align with the established or proposed trading rules for each digital resource proxy. The record management module 222 can reference the exchange rulebook field 548 when validating execution requests 308 and generating execution records 330, ensuring that all transactions comply with the specified rules and regulations. The anchoring module 223 can utilize the exchange rulebook field 548 to tailor its anchoring mechanisms and calculations to conform with any specific requirements or constraints outlined in the rulebook for each digital resource proxy. Furthermore, the resource allocation module 224 can use the exchange rulebook field 548 to implement appropriate risk management procedures, margin calculation methods, and allocation rules for allocable resources 360-1 and allocable resources 360-2 that are consistent with the established or proposed trading regulations for each digital resource proxy.

In some implementations, a block minimum field 550 within the first example digital resource proxy 502 and the second example digital resource proxy 504 can specify the smallest allowable size for block trades in each digital resource proxy within the digital anchoring system 200. The block minimum field 550 can define the threshold above which large, privately negotiated transactions can be executed outside of the central limit order book while still being cleared and settled through the exchange infrastructure. For example, both the first example digital resource proxy 502 and the second example digital resource proxy 504 have a block minimum field 550 indicating "N/A" (Not Applicable), suggesting that block trading may not be supported for these particular digital resource proxies or that the feature is not yet implemented. The data collection module 221 can use the information in the block minimum field 550 to properly categorize and process incoming trade data, distinguishing between standard order book executions and block trades when applicable. The record management module 222 can reference the block minimum field 550 when processing execution requests 308 and generating execution records 330, applying appropriate validation rules and recording methods for transactions that meet or exceed the block trade threshold. The anchoring module 223 can utilize the block minimum field 550 as a factor in its calculations, potentially adjusting its methodologies to account for the impact of large block trades on market prices and liquidity when determining anchoring parameters 420 and modified terminal execution values 342. Additionally, the resource allocation module 224 can use the block minimum field 550 to implement specific risk management procedures and margin calculation methods for block trades, ensuring appropriate allocation of allocable resources 360-1 and allocable resources 360-2 for these large-scale transactions within the digital anchoring system 200.

In some implementations, a price limit field 552 within the first example digital resource proxy 502 and the second example digital resource proxy 504 can specify the mechanisms used to manage extreme price movements and volatility for each digital resource proxy within the digital anchoring system 200. The price limit field 552 can define the specific rules and procedures implemented to prevent disorderly market conditions and protect market participants from excessive price fluctuations. For example, both the first example digital resource proxy 502 and the second example digital resource proxy 504 have a price limit field 552 indicating the use of "Dynamic Circuit Breakers," which means the range in which prices can move is reset continuously on a rolling 60-minute lookback window, with a 2-minute trading halt initiated if markets move +/−10% within that time frame. This dynamic approach to price limits can provide flexibility in responding to changing market conditions while still offering protection against sudden, extreme price movements. The data collection module 221 can use the information in the price limit field 552 to continuously monitor and analyze incoming market data, identifying potential breaches of price limits and triggering appropriate system responses. The record management module 222 can reference the price limit field 552 when processing execution requests 308 and generating execution records 330, rejecting or queuing orders that would violate the current price limits. The anchoring module 223 can utilize the price limit field 552 as a factor in its calculations, potentially adjusting anchoring parameters 420 or modified terminal execution values 342 to account for the impact of price limits on market dynamics and liquidity. Additionally, the resource allocation module 224 can use the price limit field 552 to implement risk management procedures that adapt to changing volatility conditions, adjusting margin requirements and position limits during periods of heightened market stress to ensure the continued stability and integrity of the digital anchoring system 200.

In some implementations, a vendor codes field 554 within the first example digital resource proxy 502 and the second example digital resource proxy 504 can specify unique identifiers assigned by external data providers or market participants to each digital resource proxy within the digital anchoring system 200. The vendor codes field 554 can include a collection of alphanumeric strings that correspond to the specific identifiers used by various financial data vendors (e.g., Bloomberg, Reuters, FactSet, and/or the like) to reference and track the digital resource proxy across different platforms and systems. For example, both the first example digital resource proxy 502 and the second example digital resource proxy 504 have a vendor codes field 554 marked as "TBD" (To Be Determined), indicating that the specific vendor codes are yet to be assigned or may be subject to negotiation with external data providers. The data collection module 221 can use the information in the vendor codes field 554 to establish and maintain mappings between internal system identifiers and external vendor codes, enabling seamless integration with third-party data feeds and analytics tools. This mapping process can involve creating a lookup table that associates each digital resource proxy's internal identifier with its corresponding vendor codes, allowing for rapid translation between different identification systems. The record management module 222 can reference the vendor codes field 554 when generating and indexing execution records 330, incorporating relevant vendor codes into the transaction data to facilitate cross-referencing and reconciliation with external systems. For instance, when processing an execution request 308 for a digital resource proxy, the record management module 222 can include the associated vendor codes in the resulting execution record 330, enabling downstream systems to easily match the transaction with corresponding data from external sources. The anchoring module 223 can utilize the vendor codes field 554 to enhance its data acquisition and validation processes, leveraging the unique identifiers to cross-check pricing and market data obtained from multiple sources. This cross-validation can involve comparing real-time quotes or reference data retrieved using different vendor codes for the same digital resource proxy, helping to identify and resolve discrepancies or potential data quality issues. Furthermore, the resource allocation module 224 can use the vendor codes field 554 to streamline reporting and communication processes with external stakeholders, ensuring that allocable resources 360-1 and allocable resources 360-2 are correctly attributed and reported using industry-standard identifiers recognized by counterparties, regulators, and data consumers.

In some implementations, a fee structure field 556 within the first example digital resource proxy 502 and the second example digital resource proxy 504 can define the comprehensive set of charges, commissions, and incentives associated with trading and maintaining positions in each digital resource proxy within the digital anchoring system 200. The fee structure field 556 can include a detailed breakdown of various cost components (e.g., exchange fees, clearing fees, regulatory fees, and/or the like) and potential rebates or discounts applicable to different types of market participants or trading activities. For example, both the first example digital resource proxy 502 and the second example digital resource proxy 504 have a fee structure field 556 specifying "Open Interest Fees," indicating that the primary fee mechanism is based on the total number of outstanding contracts held by market participants. The data collection module 221 can use the information in the fee structure field 556 to incorporate fee-related data into its market analysis and pricing calculations, ensuring that the full cost of trading is accurately reflected in the system's economic models. This process can involve continuously updating fee schedules and applying them to real-time market data, allowing for the calculation of effective spreads and true transaction costs for each digital resource proxy. The record management module 222 can reference the fee structure field 556 when processing execution requests 308 and generating execution records 330, applying the appropriate fees and rebates to each transaction based on the specific characteristics of the trade and the involved parties. For instance, when recording a large volume trade executed by a market maker, the record management module 222 can apply any applicable volume discounts or liquidity provision incentives specified in the fee structure, accurately capturing the net financial impact of the transaction. The anchoring module 223 can utilize the fee structure field 556 as a factor in its calculations of anchoring parameters 420 and modified terminal execution values 342, accounting for the impact of fees on the overall economics of holding and trading digital resource proxies. This consideration can involve adjusting funding rate calculations or price alignment mechanisms to reflect the true cost of maintaining positions over time, including any recurring fees based on open interest. Furthermore, the resource allocation module 224 can use the fee structure field 556 to implement sophisticated fee collection and distribution processes, managing the flow of allocable resources 360-1 and allocable resources 360-2 related to transaction costs and incentives. This can include calculating and applying tiered fee schedules based on trading volume or open interest levels, processing rebates for liquidity provision or market making activities, and ensuring that all fee-related resource transfers are accurately reflected in the entity account repository 254. Further, an ordinary person skilled in the art will appreciate that the foregoing digital resource proxies are applicable to other relevant fee structures (e.g., a transaction-fee based model) that are not explicitly recited in this disclosure.

FIGS. 6A-6B are block diagrams that illustrate example anchoring mechanisms for sample digital resource proxies in accordance with some implementations of the disclosed technology. The digital anchoring system 200 can process and manage digital resource proxies (e.g., futures contracts, perpetual futures, contracts for difference (CFDs), options contracts, and/or the like) using anchoring mechanisms that dynamically adjust execution values to maintain alignment with underlying standard resource units (e.g., commodities, cryptocurrencies, equity indices, foreign exchange rates, and/or the like). FIG. 6A illustrates a first example anchoring mechanism 602 for an oil futures contract (e.g., visualized in tabular format), while FIG. 6B depicts a second example anchoring mechanism 604 for a Bitcoin futures contract (e.g., visualized in tabular format). These examples demonstrate how the digital anchoring system 200 can implement sophisticated price adjustment and settlement procedures across diverse asset classes while maintaining a standardized framework for processing and risk management.

In some implementations, the first example anchoring mechanism 602 and the second example anchoring mechanism 604 can include a time period column 610 that defines the temporal structure for tracking and adjusting digital resource proxy values. The time period column 610 can represent a sequence of discrete time intervals (e.g., trading days, funding periods, settlement windows, and/or the like) over which the digital anchoring system 200 monitors and processes market data, executes trades, and applies anchoring adjustments. For example, in both FIG. 6A and FIG. 6B, the time period column 610 displays a series of consecutive days, ranging from Day 1 to Day 12, providing a chronological framework for analyzing price movements and implementing anchoring procedures. The data collection module 221 can use the information in the time period column 610 to synchronize data acquisition processes from external data sources 310, ensuring that relevant market information is collected and processed in alignment with the specified time intervals. The record management module 222 can reference the time period column 610 when organizing and indexing execution records 330 within the execution record repository 252, facilitating efficient retrieval and analysis of historical data across multiple time periods. The anchoring module 223 can utilize the time period column 610 to structure its calculations of terminal resource values 340, terminal execution values 410, and modified terminal execution values 342, ensuring that anchoring adjustments are applied consistently at the end of each defined time interval. Furthermore, the resource allocation module 224 can use the time period column 610 to implement time-based risk management strategies, such as adjusting margin requirements or position limits based on the duration of open positions or the proximity to contract expiration dates.

In some implementations, the first example anchoring mechanism 602 and the second example anchoring mechanism 604 can include an initial period value 612 that represents the starting price or valuation of the digital resource proxy at the beginning of each time interval. The initial period value 612 can serve as a baseline reference point for tracking price movements and calculating subsequent adjustments within the digital anchoring system 200. For example, in FIG. 6A, the initial period value 612 for Day 1 of the oil futures contract is shown as "73.83," while in FIG. 6B, the initial period value 612 for Day 1 of the Bitcoin futures contract is "65,400." These values can reflect the opening prices or previous settlement prices of the respective digital resource proxies at the start of each trading day. The data collection module 221 can use the information in the initial period value 612 to validate incoming market data, flagging potential anomalies or data feed issues if received prices deviate significantly from the expected range based on the previous day's closing or settlement values. The record management module 222 can reference the initial period value 612 when processing execution requests 308 and generating execution records 330, using it as a reference point for calculating price changes and assessing the impact of individual trades on market dynamics. The anchoring module 223 can utilize the initial period value 612 as a starting point for its daily calculations, comparing it to subsequent price movements to determine the magnitude and direction of any required anchoring adjustments. Additionally, the resource allocation module 224 can use the initial period value 612 to perform mark-to-market calculations at the beginning of each trading session, assessing the value of open positions and determining initial margin requirements based on the current market price relative to the previous day's settlement.

In some implementations, the first example anchoring mechanism 602 and the second example anchoring mechanism 604 can include an intermediary period value 614 that represents the price or valuation of the digital resource proxy at a specific point during the trading day, typically reflecting mid-day market conditions. The intermediary period value 614 can provide insight into intraday price movements and market dynamics, allowing the digital anchoring system 200 to monitor and respond to short-term fluctuations in real-time. For example, in FIG. 6A, the intermediary period value 614 for Day 1 of the oil futures contract is shown as "73.85," while in FIG. 6B, the intermediary period value 614 for Day 1 of the Bitcoin futures contract is "65,403." These values can represent the current market prices of the respective digital resource proxies at a specific time during the trading session, such as noon or another predefined checkpoint. The data collection module 221 can use the information in the intermediary period value 614 to perform real-time market analysis, calculating intraday volatility metrics, identifying potential price trends, and detecting unusual trading patterns that may require further investigation. The record management module 222 can reference the intermediary period value 614 when processing ongoing execution requests 308 and updating execution records 330, providing a snapshot of market conditions at the time of trade execution and enabling more accurate transaction cost analysis. The anchoring module 223 can utilize the intermediary period value 614 to perform preliminary calculations of potential anchoring adjustments, estimating the magnitude of end-of-day price movements and preparing for various settlement scenarios. Furthermore, the resource allocation module 224 can use the intermediary period value 614 to conduct intraday risk assessments, evaluating the need for margin calls, position limit adjustments, or other risk management actions based on observed price movements relative to the initial period value 612 and anticipated end-of-day settlement prices.

In some implementations, the first example anchoring mechanism 602 and the second example anchoring mechanism 604 can include an intermediary period reference 616 that represents the current market price or valuation of the underlying standard resource unit (e.g., spot price, index value, reference rate, and/or the like) at the same point in time as the intermediary period value 614. The intermediary period reference 616 can provide a real-time benchmark for assessing the alignment between the digital resource proxy and its underlying asset, enabling the digital anchoring system 200 to monitor and quantify any developing price discrepancies throughout the trading day. For example, in FIG. 6A, the intermediary period reference 616 for Day 1 of the oil futures contract is shown as "73.85," matching the intermediary period value 614, while in FIG. 6B, the intermediary period reference 616 for Day 1 of the Bitcoin futures contract is "65,398," slightly lower than the corresponding intermediary period value 614. These values can reflect the current spot prices or index levels of oil and Bitcoin, respectively, at the specified intraday checkpoint. The data collection module 221 can use the information in the intermediary period reference 616 to calculate real-time basis spreads (e.g., the difference between the futures price and the spot price), monitoring for potential arbitrage opportunities or market inefficiencies that may impact the pricing and liquidity of the digital resource proxy. The record management module 222 can reference the intermediary period reference 616 when processing execution requests 308 and generating execution records 330, providing additional context for trade execution by capturing the relationship between the digital resource proxy price and the underlying asset value at the time of each transaction. The anchoring module 223 can utilize the intermediary period reference 616 to perform continuous alignment checks throughout the trading day, calculating interim deviations between the digital resource proxy and its underlying standard resource unit to inform potential intraday adjustments or to prepare for end-of-day anchoring calculations. Additionally, the resource allocation module 224 can use the intermediary period reference 616 to implement dynamic risk management strategies, adjusting margin requirements or position limits in real-time based on observed changes in the relationship between the digital resource proxy and its underlying asset value.

In some implementations, the first example anchoring mechanism 602 and the second example anchoring mechanism 604 can include a projected adjustment 618 that represents an estimated anchoring parameter or funding rate calculated based on the observed price discrepancy between the digital resource proxy and its underlying standard resource unit at the intraday checkpoint. The projected adjustment 618 can provide a forward-looking indication of the potential end-of-day price alignment that may be required, allowing the digital anchoring system 200 to anticipate and prepare for upcoming settlement processes. For example, in FIG. 6A, the projected adjustment 618 for Day 1 of the oil futures contract is shown as "0.0000%," indicating no projected adjustment is necessary due to perfect alignment between the intermediary period value 614 and the intermediary period reference 616. In contrast, FIG. 6B shows a projected adjustment 618 of "0.0076%" for Day 1 of the Bitcoin futures contract, reflecting a small positive adjustment that may be applied to align the digital resource proxy more closely with its underlying asset value. The data collection module 221 can use the information in the projected adjustment 618 to gather additional market data relevant to the anticipated price alignment, such as trading volumes, order book depths, or correlated asset movements that may influence the final settlement process. The record management module 222 can reference the projected adjustment 618 when processing ongoing execution requests 308 and updating execution records 330, providing market participants with real-time information about potential end-of-day price adjustments that may impact their trading strategies or risk exposures. The anchoring module 223 can utilize the projected adjustment 618 as an input for its continuous alignment calculations, refining its estimates of required anchoring parameters 420 throughout the trading day and preparing for various settlement scenarios based on evolving market conditions. Furthermore, the resource allocation module 224 can use the projected adjustment 618 to implement proactive risk management measures, such as adjusting intraday margin requirements or triggering early warning notifications for positions that may be significantly impacted by the anticipated end-of-day price alignment.

In some implementations, the first example anchoring mechanism 602 and the second example anchoring mechanism 604 can include a terminal period value 620 that represents the final trading price or market valuation of the digital resource proxy at the end of each time interval, typically reflecting closing market conditions. The terminal period value 620 can serve as a critical input for settlement calculations, risk assessments, and the determination of required anchoring adjustments within the digital anchoring system 200. For example, in FIG. 6A, the terminal period value 620 for Day 1 of the oil futures contract is shown as "73.82," while in FIG. 6B, the terminal period value 620 for Day 1 of the Bitcoin futures contract is "65,409." These values can represent the last traded prices or closing market quotes for the respective digital resource proxies at the end of each trading session. The data collection module 221 can use the information in the terminal period value 620 to perform end-of-day market analysis, calculating daily returns, assessing price volatility, and identifying any significant deviations from historical patterns or market expectations. The record management module 222 can reference the terminal period value 620 when finalizing execution records 330 for the trading day, using it as a benchmark for calculating mark-to-market gains or losses on open positions and determining the profitability of executed trades. The anchoring module 223 can utilize the terminal period value 620 as a key input for its end-of-day alignment calculations, comparing it to the terminal period reference 622 to determine the precise anchoring adjustment required to maintain proper alignment between the digital resource proxy and its underlying standard resource unit. Additionally, the resource allocation module 224 can use the terminal period value 620 to perform final daily risk assessments, calculating variation margin requirements, updating collateral valuations, and preparing for the settlement and allocation of allocable resources 360-1 and allocable resources 360-2 based on the day's closing prices.

In some implementations, the first example anchoring mechanism 602 and the second example anchoring mechanism 604 can include a terminal period reference 622 that represents the final market price or valuation of the underlying standard resource unit (e.g., spot price, index value, reference rate, and/or the like) at the end of each time interval. The terminal period reference 622 can serve as the ultimate benchmark for assessing the alignment between the digital resource proxy and its underlying asset, providing the basis for calculating necessary anchoring adjustments and ensuring proper settlement within the digital anchoring system 200. For example, in FIG. 6A, the terminal period reference 622 for Day 1 of the oil futures contract is shown as "73.86," slightly higher than the corresponding terminal period value 620, while in FIG. 6B, the terminal period reference 622 for Day 1 of the Bitcoin futures contract is "65,400," lower than its terminal period value 620. These values can reflect the closing spot prices or final index levels of oil and Bitcoin, respectively, at the end of each trading day. The data collection module 221 can use the information in the terminal period reference 622 to calculate end-of-day basis spreads, assessing the effectiveness of the digital resource proxy in tracking its underlying asset and identifying any persistent pricing anomalies that may require further investigation or adjustment to the anchoring mechanism. The record management module 222 can reference the terminal period reference 622 when finalizing execution records 330 and preparing settlement reports, providing a clear comparison between the digital resource proxy's closing price and the actual value of its underlying asset. The anchoring module 223 can utilize the terminal period reference 622 as the primary input for calculating the final anchoring parameter 420, determining the precise adjustment required to align the digital resource proxy with its underlying standard resource unit at the end of each trading day. Furthermore, the resource allocation module 224 can use the terminal period reference 622 to implement final daily. In some implementations, the digital anchoring system 200 can process and manage digital resource proxies (e.g., futures contracts, perpetual futures, contracts for difference (CFDs), options contracts, and/or the like) using anchoring mechanisms that align the execution values (e.g., settlement prices, mark prices, closing levels, and/or the like) of these proxies with the resource values (e.g., spot prices, index values, reference rates, and/or the like) of their corresponding standard resource units (e.g., commodities, cryptocurrencies, equity indices, foreign exchange rates, and/or the like). The anchoring module 223 within the memory 220 can implement these anchoring mechanisms through a series of computational processes that analyze market data, calculate deviations, and apply adjustments to maintain proper alignment between digital resource proxies and their underlying standard resource units. For example, FIG. 6A illustrates a first example anchoring mechanism 602 for an oil futures contract, while FIG. 6B depicts a second example anchoring mechanism 604 for a Bitcoin futures contract. These examples demonstrate how the digital anchoring system 200 can process different asset classes with distinct market characteristics while maintaining a consistent framework for price alignment and settlement procedures.

In some implementations, a time period column 610 within the first example anchoring mechanism 602 and the second example anchoring mechanism 604 can define the temporal structure for processing and adjusting digital resource proxies within the digital anchoring system 200. The time period column 610 can represent a sequence of discrete time intervals (e.g., trading days, funding periods, settlement windows, and/or the like) over which the anchoring mechanisms operate. For example, both the first example anchoring mechanism 602 and the second example anchoring mechanism 604 show a time period column 610 with sequential day numbers, indicating that the anchoring process occurs on a daily basis. This daily frequency can allow for regular alignment between digital resource proxies and their underlying standard resource units, helping to maintain accurate pricing and reduce the potential for significant deviations over time. The data collection module 221 can use the information in the time period column 610 to schedule and synchronize data acquisition processes, ensuring that relevant market data (e.g., price quotes, trading volumes, order book depths, and/or the like) is collected and processed at the appropriate intervals for each digital resource proxy. The record management module 222 can reference the time period column 610 when organizing and indexing execution records 330 within the execution record repository 252, facilitating efficient retrieval and analysis of historical data for specific time periods. The anchoring module 223 can utilize the time period column 610 to structure its calculations of terminal resource values 340, terminal execution values 410, and modified terminal execution values 342, ensuring that anchoring parameters 420 are applied consistently across defined time intervals. Furthermore, the resource allocation module 224 can use the time period column 610 to implement time-based risk management strategies, adjust margin requirements, and manage the allocation of allocable resources 360-1 and allocable resources 360-2 among market participants on a periodic basis aligned with the specified time intervals.

In some implementations, an initial period value 612 within the first example anchoring mechanism 602 and the second example anchoring mechanism 604 can represent the starting price or valuation of a digital resource proxy (e.g., futures contract, perpetual future, contract for difference, and/or the like) at the beginning of each time interval within the digital anchoring system 200. The initial period value 612 can serve as a baseline reference point for tracking price movements and calculating adjustments throughout the specified time period. For example, in the first example anchoring mechanism 602 for the oil futures contract, the initial period value 612 for Day 1 is shown as "73.83," while in the second example anchoring mechanism 604 for the Bitcoin futures contract, the initial period value 612 for Day 1 is "65,400." These values can represent the opening prices or previous settlement prices of the respective digital resource proxies at the start of the trading day. The data collection module 221 can use the information in the initial period value 612 to validate incoming market data, ensuring that reported prices and trading activity align with the expected range based on the starting value for each digital resource proxy. This validation process can involve implementing statistical filters (e.g., moving averages, standard deviation thresholds, and/or the like) to identify potential data anomalies or market disruptions that deviate significantly from the initial period value 612. The record management module 222 can reference the initial period value 612 when processing execution requests 308 and generating execution records 330, using it as a reference point for calculating price changes and assessing the impact of individual trades on the overall market. For instance, when recording a large volume transaction, the record management module 222 can compare the execution price to the initial period value 612 to determine if the trade has a significant market impact that may require additional scrutiny or risk management measures. The anchoring module 223 can utilize the initial period value 612 as a starting point for its calculations of terminal execution values 410 and modified terminal execution values 342, measuring price deviations and determining appropriate anchoring parameters 420 relative to this initial reference. This can involve implementing sophisticated time-weighted average price (TWAP) algorithms that consider both the initial period value 612 and subsequent price movements to calculate fair value estimates for the digital resource proxy throughout the trading day. Additionally, the resource allocation module 224 can use the initial period value 612 to establish baseline valuations for open positions, calculate mark-to-market adjustments, and determine initial margin requirements at the beginning of each trading period, ensuring that allocable resources 360-1 and allocable resources 360-2 are appropriately allocated based on the current market conditions and risk exposures associated with each digital resource proxy.

In some implementations, an intermediary period value 614 within the first example anchoring mechanism 602 and the second example anchoring mechanism 604 can represent the price or valuation of a digital resource proxy (e.g., futures contract, perpetual future, contract for difference, and/or the like) at a specified point during the active trading period within the digital anchoring system 200. The intermediary period value 614 can provide a snapshot of market conditions and price movements that occur between the initial opening and final settlement of each trading interval. For example, in the first example anchoring mechanism 602 for the oil futures contract, the intermediary period value 614 for Day 1 is shown as "73.85," while in the second example anchoring mechanism 604 for the Bitcoin futures contract, the intermediary period value 614 for Day 1 is "65,403." These values can represent mid-day prices, volume-weighted average prices (VWAP), or other representative measures of the digital resource proxy's value during the active trading session. The data collection module 221 can use the information in the intermediary period value 614 to perform real-time market analysis and detect potential price anomalies or trading patterns that may require further investigation. This analysis can involve implementing advanced statistical techniques (e.g., regression analysis, volatility modeling, and/or the like) to compare the intermediary period value 614 with historical price patterns and identify any unusual market behavior. The record management module 222 can refer to the intermediary period value 614 when updating execution records 330, providing a mid-period checkpoint for assessing the cumulative impact of trades and market movements on the digital resource proxy's valuation. For instance, the record management module 222 can calculate intraday price volatility metrics by comparing the intermediary period value 614 to the initial period value 612 and recent trade prices, helping to identify periods of heightened market activity or potential instability. The anchoring module 223 can utilize the intermediary period value 614 as a key input for calculating projected adjustments and estimating potential end-of-day settlement prices. This can involve implementing predictive modeling techniques (e.g., time series forecasting, machine learning algorithms, and/or the like) that consider the relationship between the intermediary period value 614, historical price patterns, and current market conditions to project likely price movements for the remainder of the trading period. Furthermore, the resource allocation module 224 can use the intermediary period value 614 to perform intraday risk assessments, adjust margin requirements, and manage the allocation of allocable resources 360-1 and allocable resources 360-2 based on updated market valuations and position exposures. This dynamic resource management can include implementing automated triggers for margin calls or position adjustments when the intermediary period value 614 indicates significant price movements that may impact the risk profile of market participants' portfolios.

In some implementations, an intermediary period reference 616 within the first example anchoring mechanism 602 and the second example anchoring mechanism 604 can represent the current market price or valuation of the underlying standard resource unit (e.g., commodity, cryptocurrency, equity index, foreign exchange rate, and/or the like) corresponding to each digital resource proxy within the digital anchoring system 200. The intermediary period reference 616 can provide a real-time benchmark against which the digital resource proxy's price can be compared, allowing for the assessment of any deviations or misalignments that may require adjustment through the anchoring mechanism. For example, in the first example anchoring mechanism 602 for the oil futures contract, the intermediary period reference 616 for Day 1 is shown as "73.85," representing the mid-day spot price of oil. In the second example anchoring mechanism 604 for the Bitcoin futures contract, the intermediary period reference 616 for Day 1 is "65,398," indicating the current market price of Bitcoin. The data collection module 221 can use the information in the intermediary period reference 616 to continuously monitor and analyze the relationship between the digital resource proxy and its underlying standard resource unit. This monitoring process can involve implementing high-frequency data processing pipelines that ingest real-time price feeds from multiple sources (e.g., exchanges, brokers, data aggregators, and/or the like) to maintain an up-to-date and accurate intermediary period reference 616 for each standard resource unit. The record management module 222 can reference the intermediary period reference 616 when processing execution requests 308 and generating execution records 330, providing context for the relative pricing of the digital resource proxy compared to its underlying asset. For instance, when recording a new trade, the record management module 222 can calculate and store the basis (difference between the futures price and the spot price) using the intermediary period reference 616, allowing for detailed analysis of market dynamics and arbitrage opportunities. The anchoring module 223 can utilize the intermediary period reference 616 as a critical input for calculating projected adjustments and determining appropriate anchoring parameters 420. This can involve implementing sophisticated statistical models (e.g., cointegration analysis, error correction models, and/or the like) that quantify the relationship between the digital resource proxy's price and the intermediary period reference 616, allowing for the detection of significant deviations and the calculation of optimal adjustment factors. Additionally, the resource allocation module 224 can use the intermediary period reference 616 to assess the market risk and potential exposure of open positions, adjusting margin requirements and collateral valuations based on the current relationship between the digital resource proxy and its underlying standard resource unit. This dynamic risk management can include implementing scenario analysis tools that simulate potential price movements in both the digital resource proxy and the underlying asset, using the intermediary period reference 616 as a key variable in stress testing and exposure calculations.

In some implementations, a projected adjustment 618 within the first example anchoring mechanism 602 and the second example anchoring mechanism 604 can represent an estimated correction factor calculated by the digital anchoring system 200 to align the value of a digital resource proxy (e.g., futures contract, perpetual future, contract for difference, and/or the like) with its corresponding standard resource unit. The projected adjustment 618 can serve as a forward-looking indicator of the potential price adjustment required to maintain proper alignment between the digital resource proxy and its underlying asset. For example, in the first example anchoring mechanism 602 for the oil futures contract, the projected adjustment 618 for Day 1 is shown as "0.0000%," indicating no projected adjustment is necessary at that point. In the second example anchoring mechanism 604 for the Bitcoin futures contract, the projected adjustment 618 for Day 1 is "0.0076%," suggesting a small positive adjustment may be required. The data collection module 221 can use the information in the projected adjustment 618 to gather and analyze additional market data that may influence the final adjustment calculation. This data collection process can involve implementing adaptive sampling techniques that increase the frequency and depth of data acquisition for market factors (e.g., trading volumes, order book imbalances, correlated asset movements, and/or the like) that have historically shown strong correlations with significant projected adjustments. The record management module 222 can reference the projected adjustment 618 when processing new execution requests 308, potentially flagging or prioritizing orders that may be influenced by the anticipated price adjustment. For instance, the record management module 222 can implement a smart order routing system that considers the projected adjustment 618 when determining optimal execution strategies for large orders, potentially breaking them into smaller tranches or adjusting their timing to minimize market impact. The anchoring module 223 can utilize the projected adjustment 618 as an intermediate output in its ongoing calculations, continuously refining and updating this projection based on real-time market data and statistical analysis. This refinement process can involve implementing machine learning algorithms (e.g., gradient boosting machines, neural networks, and/or the like) that learn from historical patterns of projected and actual adjustments to improve the accuracy of future projections. Furthermore, the resource allocation module 224 can use the projected adjustment 618 to proactively manage risk and resource allocation, potentially adjusting margin requirements or triggering pre-emptive position adjustments based on the anticipated price changes. This forward-looking risk management can include implementing predictive analytics tools that estimate the potential impact of the projected adjustment 618 on portfolio values and risk exposures, allowing for dynamic reallocation of allocable resources 360-1 and allocable resources 360-2 to maintain optimal risk-adjusted returns for market participants.

In some implementations, a terminal period value 620 within the first example anchoring mechanism 602 and the second example anchoring mechanism 604 can represent the final trading price or valuation of a digital resource proxy (e.g., futures contract, perpetual future, contract for difference, and/or the like) at the conclusion of each time interval within the digital anchoring system 200. The terminal period value 620 can serve as the last observed market price before the application of any end-of-day adjustments or settlement procedures. For example, in the first example anchoring mechanism 602 for the oil futures contract, the terminal period value 620 for Day 1 is shown as "73.82," while in the second example anchoring mechanism 604 for the Bitcoin futures contract, the terminal period value 620 for Day 1 is "65,409." These values can represent the closing prices or last traded prices of the respective digital resource proxies at the end of the trading day. The data collection module 221 can use the information in the terminal period value 620 to perform end-of-day data validation and market analysis, ensuring that the final recorded price accurately reflects the true market conditions and is free from potential manipulation or errors. This validation process can involve implementing cross-market comparison algorithms that check the terminal period value 620 against correlated assets, related derivatives, and international markets to identify any anomalies or suspicious price movements. The record management module 222 can reference the terminal period value 620 when finalizing execution records 330 for the trading period, using it as the definitive price for marking open positions and calculating daily performance metrics. For instance, the record management module 222 can implement an automated end-of-day reconciliation process that compares all recorded trades against the terminal period value 620, flagging any transactions with significant price deviations for further review and potential adjustment. The anchoring module 223 can utilize the terminal period value 620 as a critical input for calculating the final anchoring parameters 420 and determining the necessary adjustments to align the digital resource proxy with its underlying standard resource unit. This calculation process can involve implementing advanced statistical techniques (e.g., Bayesian inference, Monte Carlo simulations, and/or the like) that consider the terminal period value 620 in conjunction with historical price patterns, market microstructure factors, and macroeconomic indicators to determine the magnitude of the optimal adjustment. Additionally, the resource allocation module 224 can use the terminal period value 620 to perform final mark-to-market calculations, settle daily profits and losses, and adjust margin requirements based on the closing prices of each digital resource proxy. This end-of-day settlement process can include implementing sophisticated netting algorithms that aggregate all trading activity and position changes throughout the day, using the terminal period value 620 as the reference price for calculating the net financial impact on each market participant's account and determining the appropriate allocation of allocable resources 360-1 and allocable resources 360-2.

In some implementations, a terminal period reference 622 within the first example anchoring mechanism 602 and the second example anchoring mechanism 604 can represent the final observed market price or valuation of the underlying standard resource unit (e.g., commodity, cryptocurrency, equity index, foreign exchange rate, and/or the like) corresponding to each digital resource proxy at the conclusion of the trading period within the digital anchoring system 200. The terminal period reference 622 can serve as the definitive benchmark against which the digital resource proxy's terminal period value 620 is compared to determine the necessary alignment adjustments. For example, in the first example anchoring mechanism 602 for the oil futures contract, the terminal period reference 622 for Day 1 is shown as "73.86," representing the closing spot price of oil. In the second example anchoring mechanism 604 for the Bitcoin futures contract, the terminal period reference 622 for Day 1 is "65,400," indicating the final market price of Bitcoin for the day. The data collection module 221 can use the information in the terminal period reference 622 to perform comprehensive end-of-day market analysis, assessing the relationship between the digital resource proxy and its underlying asset across multiple time frames and market conditions. This analysis can involve implementing sophisticated statistical techniques (e.g., correlation analysis, cointegration tests, and/or the like) to quantify the strength and stability of the relationship between the terminal period value 620 and the terminal period reference 622, identifying any persistent patterns or anomalies that may require adjustments to the anchoring mechanism. The record management module 222 can reference the terminal period reference 622 when finalizing execution records 330 for the trading period, providing a complete and accurate representation of market conditions at the time of settlement. For instance, the record management module 222 can implement an automated reconciliation process that compares the terminal period reference 622 with values obtained from multiple independent sources, ensuring data integrity and reducing the risk of settlement based on erroneous or manipulated prices. The anchoring module 223 can utilize the terminal period reference 622 as the primary benchmark for calculating the terminal adjustment 624, determining the precise magnitude and direction of the adjustment required to align the digital resource proxy with its underlying standard resource unit. This calculation process can involve implementing advanced mathematical models (e.g., proportional-integral-derivative controllers, adaptive learning algorithms, and/or the like) that consider both the current deviation between the terminal period value 620 and the terminal period reference 622 as well as historical patterns of price convergence and divergence. Furthermore, the resource allocation module 224 can use the terminal period reference 622 to implement final settlement procedures, calculate variation margin requirements, and manage the allocation of allocable resources 360-1 and allocable resources 360-2 based on the relationship between each digital resource proxy's closing price and the definitive value of its underlying standard resource unit.

In some implementations, a terminal adjustment 624 within the first example anchoring mechanism 602 and the second example anchoring mechanism 604 can represent the final calculated correction factor applied by the digital anchoring system 200 to align the value of a digital resource proxy with its corresponding standard resource unit at the end of each trading period. The terminal adjustment 624 may be derived from the comparison between the terminal period value 620 and the terminal period reference 622, taking into account various market factors and historical data. For example, in the first example anchoring mechanism 602 for the oil futures contract, the terminal adjustment 624 for Day 1 is shown as "0.0541%," while in the second example anchoring mechanism 604 for the Bitcoin futures contract, the terminal adjustment 624 for Day 1 is "0.0137%." These values may indicate the percentage adjustment applied to the terminal period value 620 to achieve alignment with the underlying asset price. The anchoring module 223 can use the terminal adjustment 624 to fine-tune its alignment algorithms, potentially implementing machine learning techniques to improve the accuracy of future adjustments based on observed patterns and outcomes. The resource allocation module 224 may utilize the terminal adjustment 624 to calculate final settlement amounts, adjust margin requirements, and rebalance portfolios, ensuring that the financial impact of the alignment process is accurately reflected in market participants' accounts.

In some implementations, a modified terminal period value 626 within the first example anchoring mechanism 602 and the second example anchoring mechanism 604 can represent the final settlement price or valuation of a digital resource proxy after applying the terminal adjustment 624. The modified terminal period value 626 may serve as the official closing price used for all end-of-day calculations, risk assessments, and financial reporting within the digital anchoring system 200. For example, in the first example anchoring mechanism 602 for the oil futures contract, the modified terminal period value 626 for Day 1 is shown as "73.86," while in the second example anchoring mechanism 604 for the Bitcoin futures contract, the modified terminal period value 626 for Day 1 is "65,400." These values may reflect the aligned prices of the digital resource proxies after the application of the terminal adjustment 624. The record management module 222 can use the modified terminal period value 626 to update execution records 330, providing a final, adjusted price for all open positions and complete transactions. The resource allocation module 224 may leverage the modified terminal period value 626 to perform definitive mark-to-market calculations, settle variation margin requirements, and update the valuation of collateral assets. This final adjusted value may also serve as the initial period value 612 for the subsequent trading period, ensuring continuity in the price alignment process across multiple time intervals.

Figure 7:
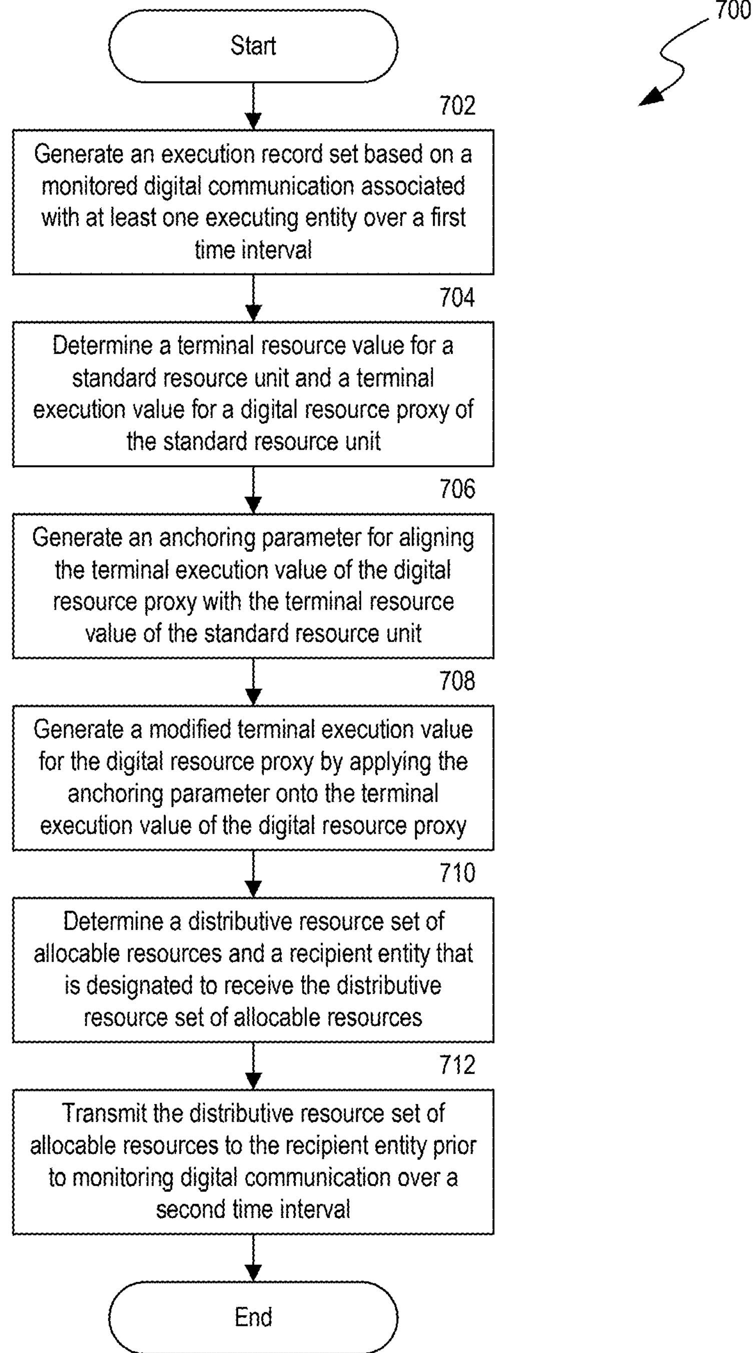
FIG. 7 is a flow diagram that illustrates an example process for automatic adjustment of digital resource proxies in accordance with some implementations of the disclosed technology.

FIG. 7 is a flow diagram that illustrates an example process 700 for automatic adjustment of digital resource proxies in accordance with some implementations of the disclosed technology. The process 700 (e.g., a computer-implemented method) can be performed by a system (e.g., digital anchoring system 200) configured to generate and apply an anchoring parameter to align terminal execution values of digital resource proxies (e.g., end-of-period price for derivative contracts) with terminal resource values and/or attributes of standard resource units (e.g., end-of-period price of underlying assets for derivative contracts). In one example, the system includes at least one hardware processor and at least one non-transitory memory storing instructions, which, when executed by the at least one hardware processor, cause the system to perform the process 700. In another example, the system includes a non-transitory, computer-readable storage medium comprising instructions recorded thereon, which, when executed by at least one data processor, cause the system to perform the process 700.

At block 702, the system can generate an execution record set for digital resource proxies of standard resource units based on a monitored digital communication associated with at least one executing entity over a first time interval. For example, the system can generate an execution record set where each execution record indicates a digital resource proxy of a standard resource unit that is associated with a dynamic resource value. In some implementations, each digital resource proxy can include an execution value at which the digital resource proxy is active for the at least one executing entity within the first time interval. In some implementations, the standard resource unit of the digital resource proxy can include a commodity, a financial instrument, an equity index, a monetary currency, a security, a bond, a cryptocurrency, an environmental product, a real estate, or a combination thereof. In some implementations, the digital resource proxy can correspond to, or represent, a standard futures contract that is listed on a designated derivatives exchange and is compliant with regulatory parameters set by Commodity Futures Trading Commission (CFTC). In some implementations, the at least one executing entity can correspond to, or represent, one or more intermediary futures commission merchants (FCMs) that manage digital resource proxies active among a plurality of user accounts.

In some implementations, the system can retrieve (e.g., from the at least one executing entity) an execution request for activating one or more digital resource proxies of the standard resource unit. The system can use the execution request to generate at least one execution record indicating one or more active digital resource proxies of the standard resource unit between the at least one executing entity and a second entity separate from the at least one executing entity. In some implementations, the system can store the at least one execution record within the execution record set. In some implementations, the second entity can correspond to, or represent, a centralized derivatives clearing organization (DCO) that validates execution of active digital resource proxies.

At block 704, the system can determine a terminal resource value for the standard resource unit and a terminal execution value for the digital resource proxy of the standard resource unit. For example, the system can determine (e.g., at expiration of the first time interval) the terminal resource value for the standard resource unit and the terminal execution value for the digital resource proxy based, in part, on execution values of active digital resource proxies recorded within the execution record set.

At block 706, the system can generate an anchoring parameter for aligning the terminal execution value of the digital resource proxy with the terminal resource value of the standard resource unit. For example, the system can generate the anchoring parameter using a first detected deviation between the terminal resource value and the terminal execution value.

At block 708, the system can generate a modified terminal execution value for the digital resource proxy of the standard resource unit by applying the anchoring parameter onto the terminal execution value of the digital resource proxy to displace the terminal execution value towards the terminal resource value. In some implementations, the system can store the modified terminal execution value as the execution value of the digital resource proxy of the standard resource unit.

At block 710, the system can determine a distributive resource set of allocable resources associated with activation of the active digital resource proxies of the at least one executing entity. For example, the system can determine, or calculate, the distribute resource set using a second detected deviation between the execution values of the active digital resource proxies and the modified terminal execution value, instead of the terminal execution value. In some implementations, the system can identify a recipient entity that is designated to receive the distributive resource set of allocable resources. In some implementations, the allocable resources associated with activation of the digital resource proxy can include physical currencies, digital representations of physical currency, cryptocurrencies, margin deposits, liquid securities, and/or a combination thereof.

In some implementations, the system can determine a source entity that is designated to provision the distributive resource set of allocable resources. For example, the system can determine the source entity using the second detected deviation between the modified terminal execution value and the execution value of the digital resource proxy. In some implementations, the system can retrieve (e.g., from the source entity) the distributive resource set of allocable resources.

In some implementations, the system can obtain a resource allocation threshold for selectively determining the recipient entity between a first entity from the at least one executing entity and a second entity separate from the at least one executing entity. In some implementations, the system can assign the first entity as the recipient entity in response to determining that the second detected deviation satisfies the resource allocation threshold, assigning the first entity as the recipient entity. In some implementations, the system can assign the second entity as the recipient entity in response to determining that the second detected deviation does not satisfy the resource allocation threshold.

At block 712, the system can transmit the distributive resource set of allocable resources to the recipient entity. In some implementations, the system can transmit the distributive resource set prior to monitoring digital communication associated with the at least one executing entity over a second time interval following the first time interval. In some implementations, the system can identify an entity account, or a digital representative profile of entity, associated with the recipient entity that is designated to receive the distributive resource set. In some implementations, the entity account can include a stored resource set of the allocable resources. In some implementations, the system can update the entity account of the recipient entity by adding the allocable resources of the distributive resource set to the stored resource set.

Example Computer System

Figure 8:
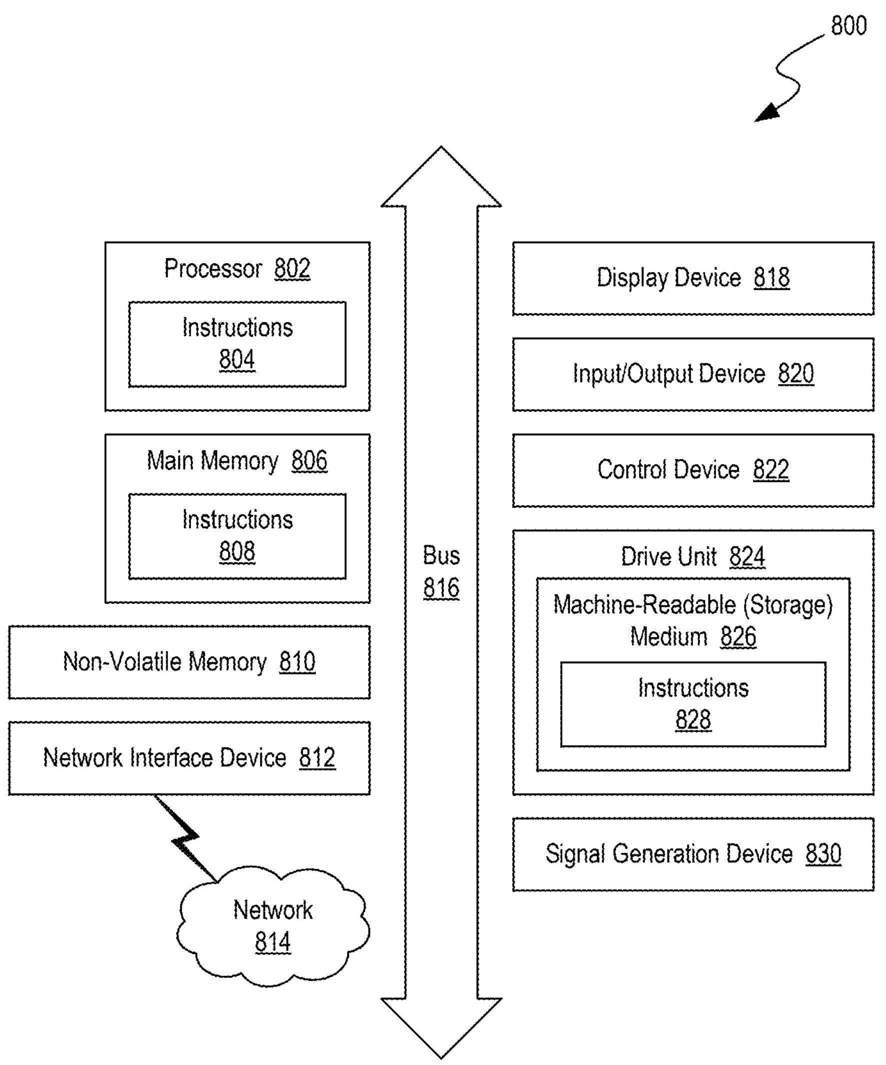
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-on-chip (SOC), a single-board computer system (SBC), or a distributed system such as a mesh of computer systems, or it can include one or more cloud components in one or more networks. Where appropriate, one or more computer systems 800 can perform operations in real time, in near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

Further Examples

The established financial market infrastructure within the United States presents substantial impediments to the introduction of innovative derivative products (e.g., perpetual futures, contracts for difference) that provide continuous exposure to underlying assets without predetermined expiration dates. This challenge arises from the structured, standardized nature of conventional futures contracts and the associated post-trade processing systems (e.g., clearing, settlement, margining) that has developed over decades to support these standardized instruments. The current infrastructure is specifically designed for contracts with predefined specifications (e.g., fixed contract sizes, discrete maturity dates, standardized daily settlement procedures) and lacks the requisite flexibility to accommodate more adaptable, continuously traded financial instruments.

The existing U.S. futures market operates through a sophisticated, intermediated framework comprising multiple regulated entities (e.g., designated contract markets, derivatives clearing organizations, futures commission merchants) that must synchronize their operations to maintain market integrity and stability. This framework imposes stringent requirements on contract design and post-trade processing that are fundamentally incompatible with the operational mechanics of perpetual futures or contracts for difference. Specifically, the absence of fixed maturity dates, the requirement for frequent (often multiple intraday) funding payments between long and short position holders, and the capability to trade in fractional contract units present significant integration challenges for current U.S. market systems.

Contemporary systems and market structures outside the U.S. have implemented alternative methodologies to offer more flexible derivative products. For instance, cryptocurrency exchanges frequently function as vertically integrated platforms capable of offering perpetual futures without the constraints inherent in an intermediated market structure. However, these systems typically consolidate counterparty risk within a single entity and lack the robust risk management and customer protection mechanisms embedded in the U.S. regulatory framework. Additionally, over-the-counter (OTC) markets for contracts for difference (CFDs) exist in numerous jurisdictions (e.g., OTC markets exist within every jurisdiction), but these bilateral agreements lack the transparency, liquidity, and centralized clearing advantages characteristic of exchange-traded products.

The limitations of existing U.S. based systems are particularly evident in their inability to efficiently process the continuous rebalancing and frequent settlement flows necessitated by perpetual futures-like products. Current U.S. futures post-trade infrastructures at derivatives clearing organizations (DCOs) and futures commission merchants (FCMs) are engineered to process a single, standardized settlement value per contract per day. These systems lack the inherent capability to manage secondary or auxiliary payment streams between individual position holders, which constitutes a fundamental feature of perpetual futures products for maintaining alignment with underlying asset prices.

The disclosed system addresses these limitations through the introduction of a novel anchoring mechanism that leverages existing operational procedures within the U.S. futures market infrastructure to create a synthetic rebalancing effect analogous to that of perpetual futures. The system utilizes the discretionary authority of designated contract markets (DCMs) to establish end-of-day settlement prices for listed derivative contracts. For example, the system implements an algorithm that adjusts the daily settlement price of a futures contract to align it with a reference value derived from the underlying asset, thereby creating a synthetic funding payment without necessitating actual cash movements between counterparties.

The system monitors digital communications associated with executing entities (e.g., futures commission merchants, market participants) over defined time intervals to generate an execution record set. For example, the system captures and processes trade execution data, including contract prices and volumes, throughout the trading day. Furthermore, the system determines, at the expiration of each time interval (e.g., end of trading day), both a terminal resource value for the underlying asset and a terminal execution value for the derivative contract based on the recorded execution data.

The system generates an anchoring parameter by calculating the deviation between the terminal resource value and the terminal execution value. For example, this anchoring parameter represents the percentage difference between the closing market price of the derivative and the closing price of the underlying asset. The system subsequently applies this anchoring parameter to generate a modified terminal execution value for the derivative contract, effectively displacing the settlement price towards the underlying asset's value.

The system utilizes this modified terminal execution value, rather than the unadjusted market closing price, to determine the distribution of allocable resources (e.g., variation margin payments) associated with the active derivative positions. For example, the system calculates the difference between each position's execution price and the modified terminal execution value to determine the magnitude and direction of resource transfers required. Furthermore, the system identifies the appropriate recipient entities (e.g., clearing members, individual traders) for these resource distributions based on their respective market positions.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any specific portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words “means for.” However, the use of the term “for” in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one data processor of a system for executing a standardized resource distribution protocol for digital resource proxies of a first type, cause the system to execute resource distribution protocols of digital resource proxies of a second type via the standardized resource distribution protocol by:

generating, based on a monitored digital communication associated with a first processing node over a first time interval expiring prior to a predetermined expiration timestamp associated with the standardized resource distribution protocol of the digital resource proxies of the first type, an execution record set, each execution record indicating a digital resource proxy of the second type for a standard resource unit of allocable memory that is associated with a dynamic resource value, wherein the digital resource proxy of the second type comprises an execution value at which the digital resource proxy is active for the first processing node within the first time interval, wherein the digital resource proxy of the second type corresponds to a resource distribution protocol for allocating, at expiration of the first time interval prior to the predetermined expiration timestamp, a first quantity of allocable memory associated with the standard resource unit to one or more processing nodes, and wherein the standardized resource distribution protocol of the digital resource proxies of the first type causes allocating, at the predetermined expiration timestamp, a second quantity of allocable memory associated with the standard resource unit to the one or more processing nodes;

responsive to expiration of the first time interval prior to the predetermined expiration timestamp for the standardized resource distribution protocol:

determining a terminal resource value for the standard resource unit and a terminal execution value for the digital resource proxy of the second type for the standard resource unit based, in part, on execution values of active digital resource proxies of the second type recorded within the execution record set;

generating, using a first detected deviation between the terminal resource value and the terminal execution value, an anchoring parameter for aligning the terminal execution value of the digital resource proxy of the second type with the terminal resource value of the standard resource unit; and generating a modified terminal execution value for the digital resource proxy of the second type for the standard resource unit by applying the anchoring parameter onto the terminal execution value of the digital resource proxy of the second type to displace the terminal execution value towards the terminal resource value without performing actual allocation of the first quantity of allocable memory under the resource distribution protocol of the digital resource proxy of the second type; and responsive to expiration of the predetermined expiration timestamp, executing the standardized resource distribution protocol of the digital resource proxies of the first type for the digital resource proxy of the second type by:

determining, using a second detected deviation between the execution values of the active digital resource proxies of the second type and the modified terminal execution value instead of the terminal execution value, the second quantity of allocable memory associated with activation of the active digital resource proxies of the second type for the first processing node and a second processing node that is designated to access the second quantity of allocable memory; and transmitting the second quantity of allocable memory to the second processing node prior to monitoring digital communication associated with the first processing node over a second time interval following the predetermined expiration timestamp.

2. The non-transitory, computer-readable storage medium of claim 1, wherein the instructions further cause the system to:

determine, using the second detected deviation between the modified terminal execution value and the execution value of the digital resource proxy, a source processing node that is designated to provision the second quantity of allocable memory.

3. The non-transitory, computer-readable storage medium of claim 2, wherein the instructions further cause the system to retrieve the second quantity of allocable memory from the source processing node.

4. The non-transitory, computer-readable storage medium of claim 1, wherein the instructions further cause the system to:

identify a digital entity profile associated with the second processing node that is designated to receive the second quantity of allocable memory, the digital entity profile indicating a third quantity of allocable memory; and update the digital entity profile of the second processing node by adding the allocable memory of the second quantity to the allocable memory of the third quantity.

5. The non-transitory, computer-readable storage medium of claim 1, wherein the instructions further cause the system to:

obtain a memory allocation threshold for selectively determining the second processing node between the first processing node and a third processing node separate from the first processing node; and responsive to determining that the second detected deviation satisfies the memory allocation threshold, assigning the first processing node as the second processing node.

6. The non-transitory, computer-readable storage medium of claim 5, wherein the instructions further cause the system to:

responsive to determining that the second detected deviation does not satisfy the memory allocation threshold, assigning the third processing node as the second processing node.

7. The non-transitory, computer-readable storage medium of claim 1, wherein the instructions further cause the system to:

store the modified terminal execution value as the execution value of the digital resource proxy of the standard resource unit.

8. The non-transitory, computer-readable storage medium of claim 1, wherein the instructions further cause the system to:

retrieve, from the first processing node, an execution request for activating one or more digital resource proxies of the standard resource unit;

generating, using the execution request, at least one execution record indicating one or more active digital resource proxies of the standard resource unit between the first processing node and a third processing node separate from the first processing node; and storing the at least one execution record within the execution record set.

9. A digital anchoring system that executes resource distribution protocols of digital resource proxies of a second type via a standardized resource distribution protocol for digital resource proxies of a first type, the digital anchoring system comprising:

at least one hardware processor;

a first non-transitory memory storing instructions, which, when executed by the at least one hardware processor, cause the digital anchoring system to:

generate, based on a monitored digital communication associated with a first processing node over a first time interval expiring prior to a predetermined expiration timestamp associated with the standardized resource distribution protocol of the digital resource proxies of the first type, an execution record set, each execution record indicating a digital resource proxy of the second type for a standard resource unit of allocable memory that is associated with a dynamic resource value, wherein the digital resource proxy of the second type comprises an execution value at which the digital resource proxy is active for the first processing node, wherein the digital resource proxy of the second type corresponds to a resource distribution protocol for allocating, at expiration of the first time interval prior to the predetermined expiration timestamp, a first quantity of allocable memory associated with the standard resource unit to one or more processing nodes, and wherein the standardized resource distribution protocol of the digital resource proxies of the first type causes allocating, at the predetermined expiration timestamp, a second quantity of allocable memory associated with the standard resource unit to the one or more processing nodes; and responsive to expiration of the first time interval prior to the predetermined expiration timestamp for the standardized resource distribution protocol:

determine a terminal resource value for the standard resource unit and a terminal execution value for the digital resource proxy of the second type for the standard resource unit based, in part, on execution values of active digital resource proxies of the second type recorded within the execution record set;

generate, using a first detected deviation between the terminal resource value and the terminal execution value, an anchoring parameter for aligning the terminal execution value of the digital resource proxy of the second type with the terminal resource value of the standard resource unit; and generate a modified terminal execution value for the digital resource proxy of the second type for the standard resource unit by applying the anchoring parameter onto the terminal execution value of the digital resource proxy of the second type to displace the terminal execution value towards the terminal resource value without performing actual allocation of the first quantity of allocable memory under the resource distribution protocol of the digital resource proxy of the second type; and a second non-transitory memory communicatively coupled to the first non-transitory memory, the second non-transitory memory storing instructions, which, when executed by the at least one hardware processor responsive to expiration of the predetermined expiration timestamp, cause the digital anchoring system to:

determine, using a second detected deviation between the execution values of the active digital resource proxies of the second type and the modified terminal execution value instead of the terminal execution value, the second quantity of allocable memory associated with activation of the active digital resource proxies of the second type for the first processing node and a second processing node that is designated to access the second quantity of allocable memory; and transmit the second quantity of allocable memory to the second processing node prior to monitoring subsequent digital communication associated with the first processing node.

10. The digital anchoring system of claim 9, wherein the instructions of the second non-transitory memory further cause the digital anchoring system to:

determine, using the second detected deviation between the modified terminal execution value and the execution value of the digital resource proxy, a source processing node that is designated to provision the second quantity of allocable memory.

11. The digital anchoring system of claim 10, wherein the instructions of the second non-transitory memory further cause the digital anchoring system to retrieve the second quantity of allocable memory from the source processing node.

12. The digital anchoring system of claim 9, wherein the monitored digital communication associated with the first processing node is captured over a time interval, and wherein the terminal resource value and the terminal execution value is determined at expiration of the time interval.

13. The digital anchoring system of claim 12, wherein the time interval is a first time interval, and wherein the second quantity of allocable memory is transmitted to the second processing node prior to monitoring the subsequent digital communication associated over a second time interval following the first time interval.

14. The digital anchoring system of claim 9, wherein the instructions of the second non-transitory memory further cause the digital anchoring system to:

identify a digital entity profile associated with the second processing node that is designated to receive the second quantity of allocable memory, the digital entity profile indicating a third quantity of allocable memory; and update the digital entity profile of the second processing node by adding the allocable memory of the second quantity to the allocable memory of the third quantity stored.

15. The digital anchoring system of claim 9, wherein the instructions of the second non-transitory memory further cause the digital anchoring system to:

obtain a memory allocation threshold for selectively determining the second processing node between the first processing node and a third processing node separate from the first processing node; and responsive to determining that the second detected deviation satisfies the memory allocation threshold, assign the first processing node as the second processing node.

16. The digital anchoring system of claim 15, wherein the instructions of the second non-transitory memory further cause the digital anchoring system to:

responsive to determining that the second detected deviation does not satisfy the memory allocation threshold, assign the third processing node as the second processing node.

17. The digital anchoring system of claim 9, wherein the instructions of the first non-transitory memory further cause the digital anchoring system to:

store the modified terminal execution value as the execution value of the digital resource proxy of the standard resource unit.

18. The digital anchoring system of claim 9, wherein the instructions of the first non-transitory memory further cause the digital anchoring system to:

retrieve, from the first processing node, an execution request for activating one or more digital resource proxies of the standard resource unit;

generate, using the execution request, at least one execution record indicating one or more active digital resource proxies of the standard resource unit between the first processing node and a third processing node separate from the first processing node; and store the at least one execution record within the execution record set.

19. A computer-implemented method for executing resource distribution protocols of digital resource proxies of a second type via a standardized resource distribution protocol for digital resource proxies of a first type, the method comprising:

generating, based on a monitored digital communication associated with a first processing node over a first time interval expiring prior to a predetermined expiration timestamp associated with the standardized resource distribution protocol of the digital resource proxies of the first type, an execution record set, each execution record indicating a digital resource proxy of the second type for a first standard resource unit of allocable memory that is associated with a dynamic resource value, wherein the digital resource proxy of the second type comprises an execution value at which the digital resource proxy is active for the first processing node within the first time interval, wherein the digital resource proxy of the second type corresponds to a resource distribution protocol for allocating, at expiration of the first time interval prior to the predetermined expiration timestamp, a first quantity of allocable memory associated with the first standard resource unit to one or more processing nodes, and wherein the standardized resource distribution protocol of the digital resource proxies of the first type causes allocating, at the predetermined expiration timestamp, a second quantity of allocable memory associated with the first standard resource unit to the one or more processing nodes;

responsive to expiration of the first time interval prior to the predetermined expiration timestamp for the standardized resource distribution protocol:

determining a terminal resource value for the first standard resource unit and a terminal execution value for the digital resource proxy of the second type for the first standard resource unit based, in part, on execution values of active digital resource proxies of the second type recorded within the execution record set;

generating, using a first detected deviation between the terminal resource value and the terminal execution value, an anchoring parameter for aligning the terminal execution value of the digital resource proxy of the second type with the terminal resource value of the first standard resource unit; and generating a modified terminal execution value for the digital resource proxy of the second type for the first standard resource unit by applying the anchoring parameter onto the terminal execution value of the digital resource proxy of the second type to displace the terminal execution value towards the terminal resource value without performing actual allocation of the first quantity of allocable memory under the resource distribution protocol of the digital resource proxy of the second type; and responsive to expiration of the predetermined expiration timestamp, executing the standardized resource distribution protocol of the digital resource proxies of the first type for the digital resource proxy of the second type by:

validating the modified terminal execution value via comparing the modified terminal execution value to at least one dynamic resource value for a second standard resource unit of allocable memory that corresponds to the first standard resource unit;

determining, using a second detected deviation between the execution values of the active digital resource proxies of the second type and the modified terminal execution value instead of the terminal execution value, the second quantity of allocable memory associated with activation of the active digital resource proxies of the second type for the first processing node and a second processing node that is designated to access the second quantity of allocable memory; and transmitting the second quantity of allocable memory to the second processing node prior to monitoring digital communication associated with the first processing node over a second time interval following the predetermined expiration timestamp.

20. The computer-implemented method of claim 19 further comprising:

retrieving, from the first processing node, an execution request for activating one or more digital resource proxies of the first standard resource unit;

generating, using the execution request, at least one execution record indicating one or more active digital resource proxies of the first standard resource unit between the first processing node and a third processing node separate from the first processing node; and storing the at least one execution record within the execution record set.

* * * * *